US011886039B2

(12) United States Patent
Lyu et al.

(10) Patent No.: US 11,886,039 B2
(45) Date of Patent: Jan. 30, 2024

(54) OPTICAL IMAGING LENS GROUP

(71) Applicant: Zhejiang Sunny Optical Co., Ltd, Zhejiang Province (CN)

(72) Inventors: Saifeng Lyu, Zhejiang Province (CN); Xiaohui Zhang, Zhejiang Province (CN); Mengna Tang, Zhejiang Province (CN)

(73) Assignee: Zhejiang Sunny Optical Co., Ltd., Zhejiang Province (CN)

( * ) Notice: Subject to any disclaimer, the term of this patent is extended or adjusted under 35 U.S.C. 154(b) by 645 days.

(21) Appl. No.: 17/034,671

(22) Filed: Sep. 28, 2020

(65) Prior Publication Data

US 2021/0011257 A1 Jan. 14, 2021

Related U.S. Application Data

(63) Continuation of application No. PCT/CN2019/099391, filed on Aug. 6, 2019.

(30) Foreign Application Priority Data

Dec. 5, 2018 (CN) ......................... 201811477440.0

(51) Int. Cl.
*G02B 9/62* (2006.01)
*G02B 13/00* (2006.01)
*H04N 23/55* (2023.01)

(52) U.S. Cl.
CPC ........... *G02B 9/62* (2013.01); *G02B 13/0045* (2013.01); *H04N 23/55* (2023.01)

(58) Field of Classification Search
CPC ...... H04N 23/55; H04N 5/222; H04N 5/2254; G02B 13/18; G02B 13/16; G02B 13/0015;

(Continued)

(56) References Cited

U.S. PATENT DOCUMENTS 8,310,767 B2 11/2012 Huang et al.
9,678,314 B2 6/2017 Teraoka (Continued)

FOREIGN PATENT DOCUMENTS

CN 102621664 A 8/2012
CN 105487201 A 4/2016

(Continued)

OTHER PUBLICATIONS

Office action dated Feb. 24, 2022, in connection with Chinese Patent Application No. 202110715811.X.

(Continued)

*Primary Examiner* — Travis S Fissel
(74) *Attorney, Agent, or Firm* — Norris Mclaughlin, P.A.

(57) ABSTRACT

The present disclosure discloses an optical imaging lens group including, sequentially from an object side to an image side along an optical axis, a first lens, a second lens, a third lens, a fourth lens, a fifth lens and a sixth lens, each of which has refractive power. An object-side surface of the first lens is a convex surface, and an image-side surface of the first lens is a concave surface; an image-side surface of the second lens is a concave surface; and an object-side surface of sixth lens is a concave surface. A distance TTL along the optical axis from an object-side surface of the first lens to an imaging plane of the optical imaging lens group and half of a diagonal length ImgH of an effective pixel area on the imaging plane of the optical imaging lens group satisfy TTL/ImgH≤1.23.

20 Claims, 12 Drawing Sheets

E1 E2 E3 E4 E5 E6 E7
STO
S1 S2 S3 S4 S5 S6 S7 S8 S9 S10 S11 S12 S13 S14 S15

(58) Field of Classification Search

CPC ........ G02B 13/0045; G02B 9/62; G02B 9/64; G02B 27/0172; G02B 27/0012; G02B 27/0025; G02B 15/146

USPC ................. 359/656–658, 713, 749, 756–762

See application file for complete search history.

(56) References Cited

U.S. PATENT DOCUMENTS

| | | | | |
|---|---|---|---|---|
| 10,025,067 | B2 | 7/2018 | Chen et al. | |
| 10,606,043 | B2 | 3/2020 | Bone et al. | |
| 10,641,996 | B2 | 5/2020 | Teraoka | |
| 11,226,472 | B2 | 1/2022 | Lin et al. | |
| 11,493,731 | B2 | 11/2022 | Zhang et al. | |
| 2011/0176049 | A1 | 7/2011 | Hsieh | |
| 2012/0194726 | A1 | 8/2012 | Huang et al. | |
| 2014/0071316 | A1* | 3/2014 | Asano | G02B 13/001 348/270 |
| 2015/0253547 | A1 | 9/2015 | Sun | |
| 2015/0268446 | A1 | 9/2015 | Chen et al. | |
| 2016/0077311 | A1* | 3/2016 | Tang | G02B 9/62 359/713 |
| 2017/0131522 | A1 | 5/2017 | Teraoka | |
| 2017/0219803 | A1 | 8/2017 | Lee et al. | |
| 2018/0356616 | A1 | 12/2018 | Bone et al. | |
| 2019/0278060 | A1* | 9/2019 | Teraoka | G02B 13/0045 |
| 2020/0057249 | A1 | 2/2020 | Zhang et al. | |
| 2020/0150384 | A1 | 5/2020 | Xu et al. | |
| 2020/0249440 | A1 | 8/2020 | Wenren | |
| 2021/0011257 | A1 | 1/2021 | Lyu et al. | |
| 2021/0141194 | A1* | 5/2021 | Jung | G02B 5/20 |
| 2021/0215909 | A1 | 7/2021 | Hu et al. | |

FOREIGN PATENT DOCUMENTS

| | | | |
|---|---|---|---|
| CN | 105866922 | A | 8/2016 |
| CN | 107436475 | A | 2/2017 |
| CN | 107015345 | A | 8/2017 |
| CN | 105487201 | B | 3/2018 |
| CN | 107843977 | A | 3/2018 |
| CN | 108152933 | A | 6/2018 |
| CN | 108152934 | A | 6/2018 |
| CN | 108319003 | A | 7/2018 |
| CN | 108717225 | A | 10/2018 |
| CN | 108802972 | A | 11/2018 |
| CN | 109283664 | A | 1/2019 |
| CN | 209215720 | U | 8/2019 |
| JP | 2000330014 | A | 11/2000 |
| JP | 2015169889 | A | 9/2015 |
| TW | 201814348 | A | 4/2018 |
| WO | 2017/160093 | A1 | 9/2017 |

OTHER PUBLICATIONS

First Examination Report dated Feb. 12, 2021, in connection with India Patent Application No. 202017043130.

International Search Report dated Oct. 8, 2019, in connection with in connection with PCT International Application No. PCT/CN2019/099391.

English translation of International Search Report date Oct. 8, 2019, in connection with in connection with PCT International Application No. PCT/CN2019/099391.

Written Opinion dated Nov. 1, 2019, in connection with PCT International Application No. PCT/CN2019/099391.

Office Action dated Jul. 22, 2023, in connection with Chinese Patent Application No. 20181147744.0.

* cited by examiner

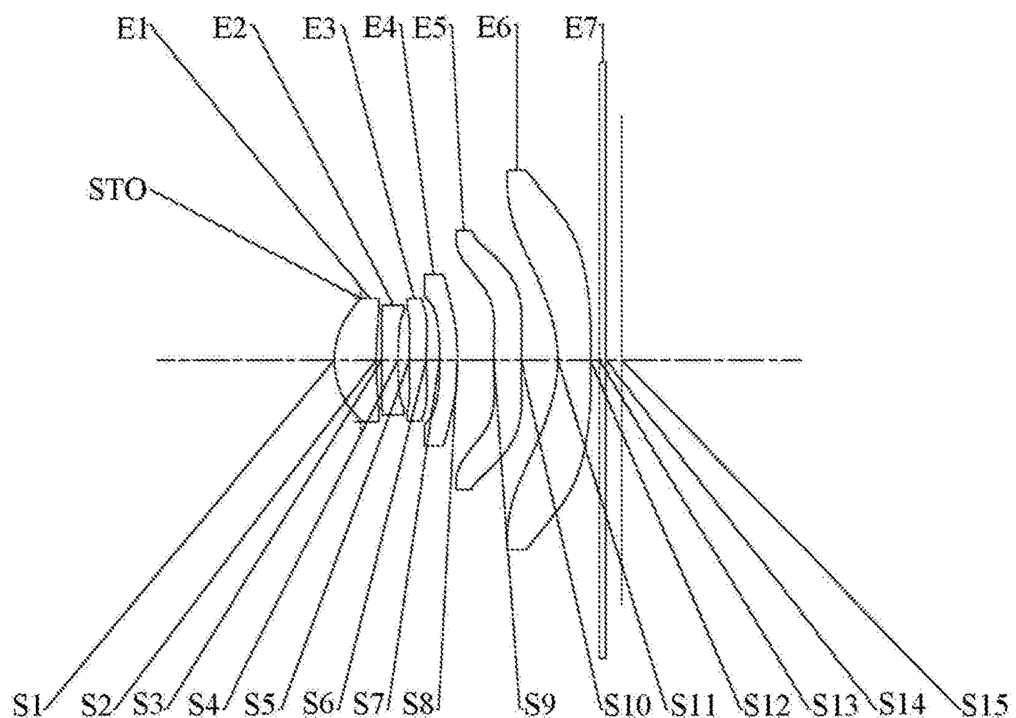
Fig. 1
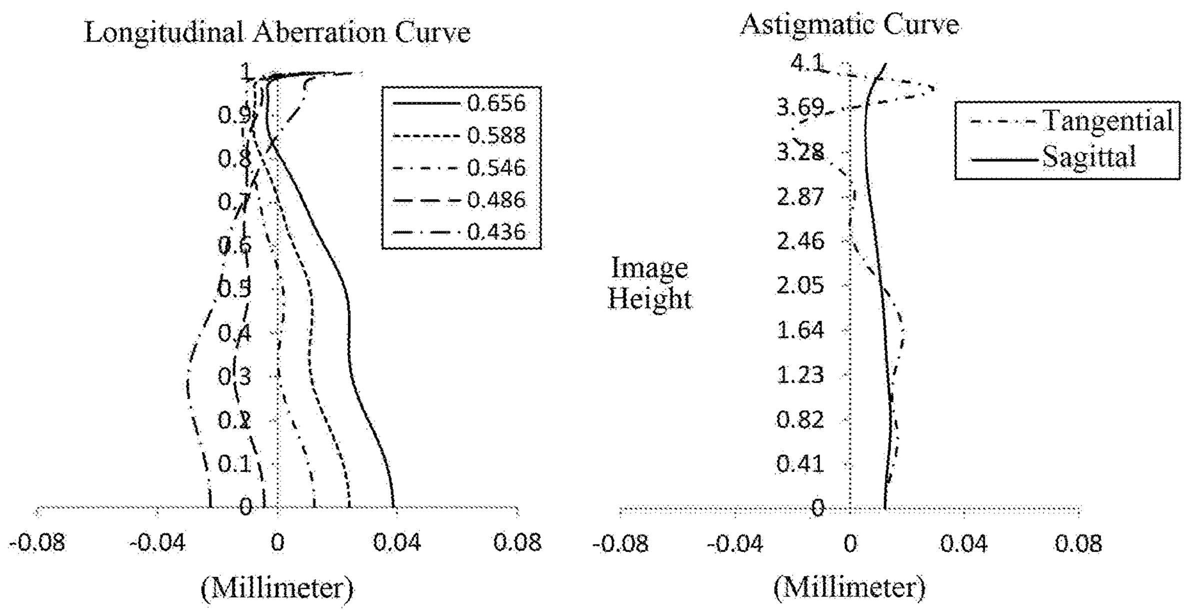
Fig. 2A
Fig. 2B

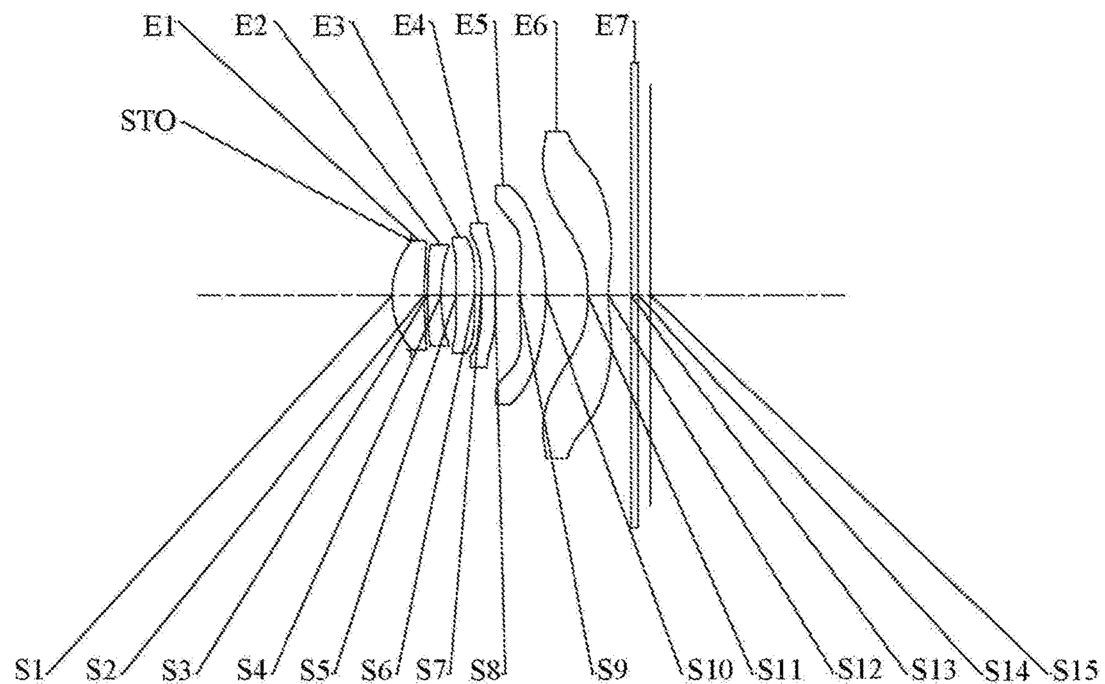
Fig. 5
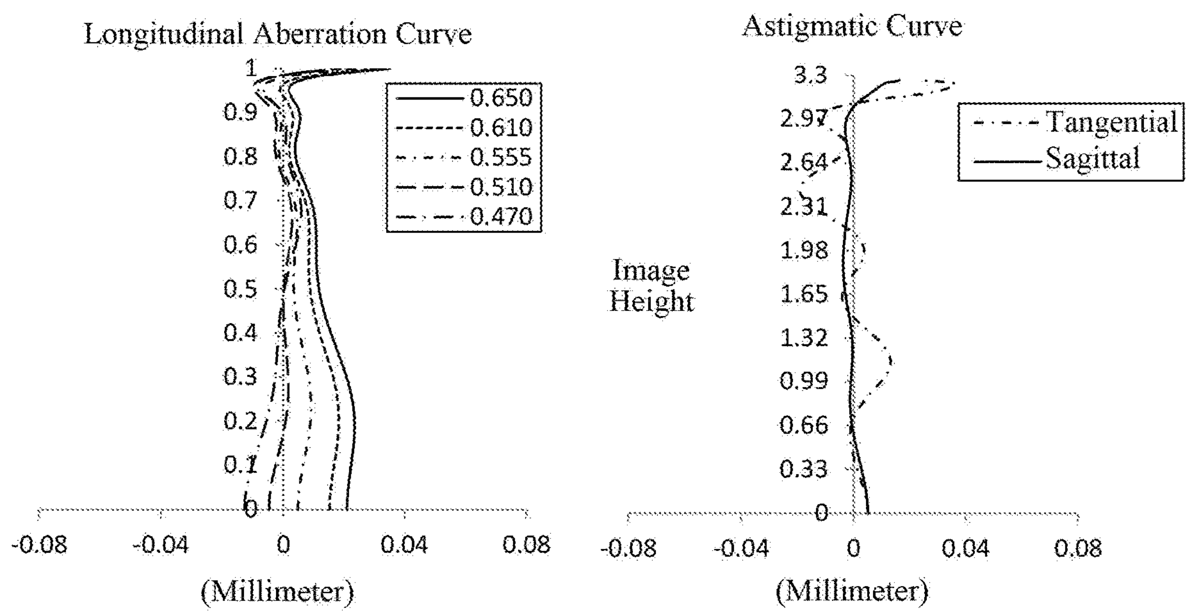
Fig. 6A
Fig. 6B

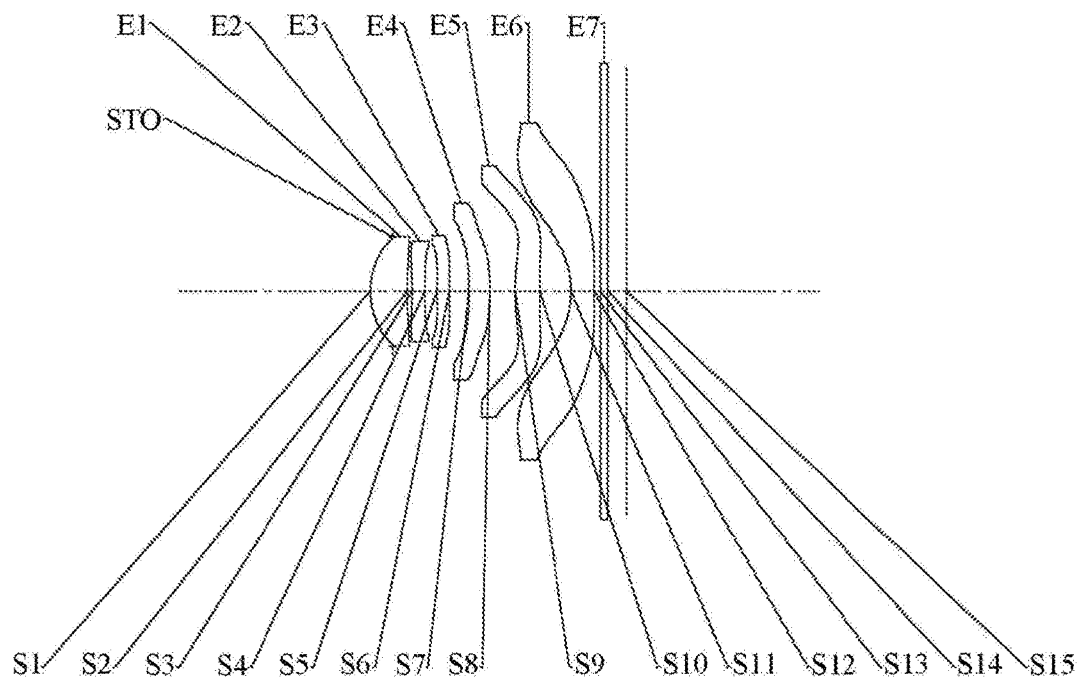
Fig. 9
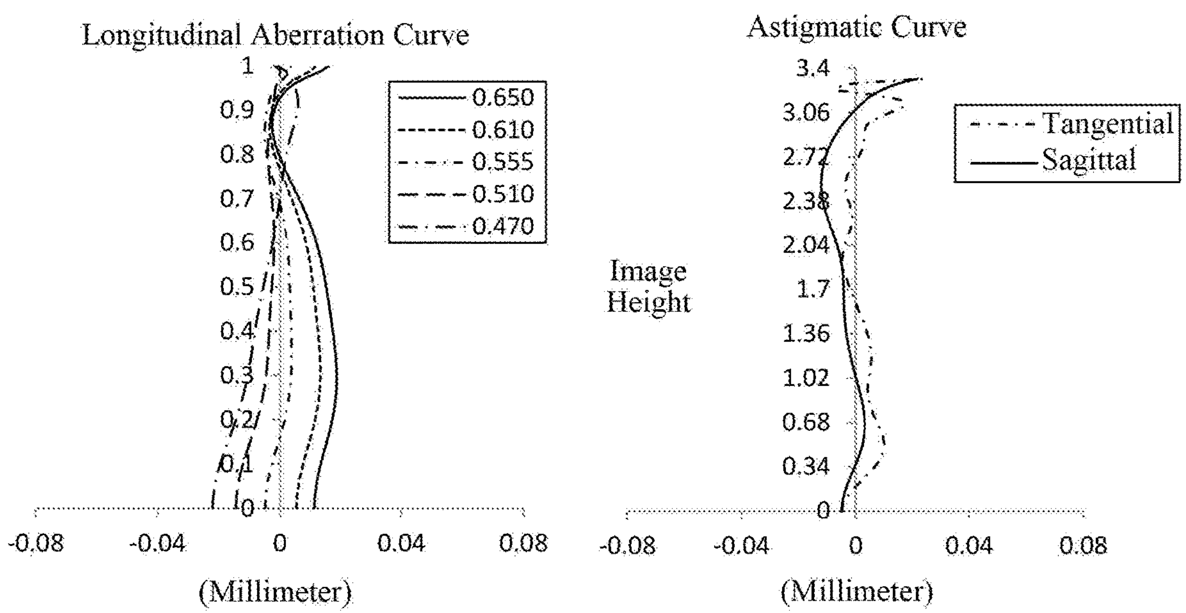
Fig. 10A
Fig. 10B

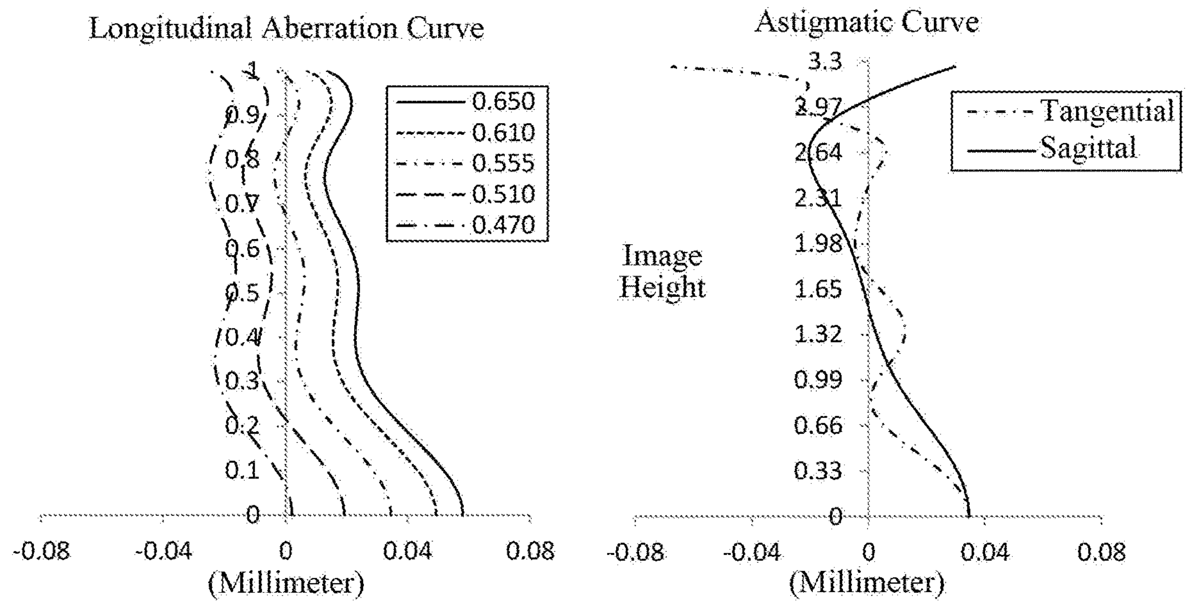
Fig. 12A
Fig. 12B
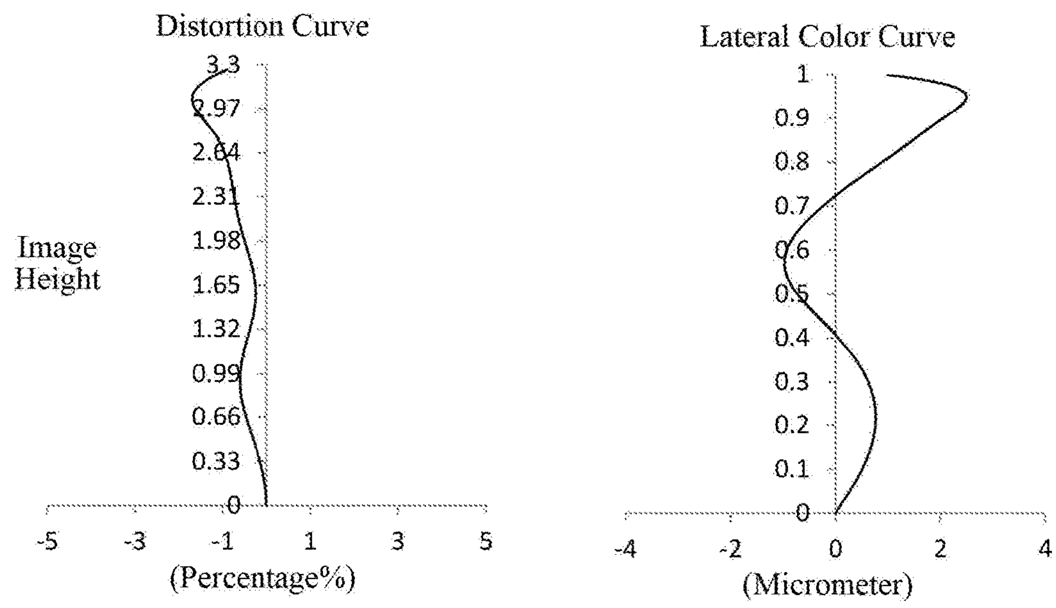
Fig. 12C
Fig. 12D

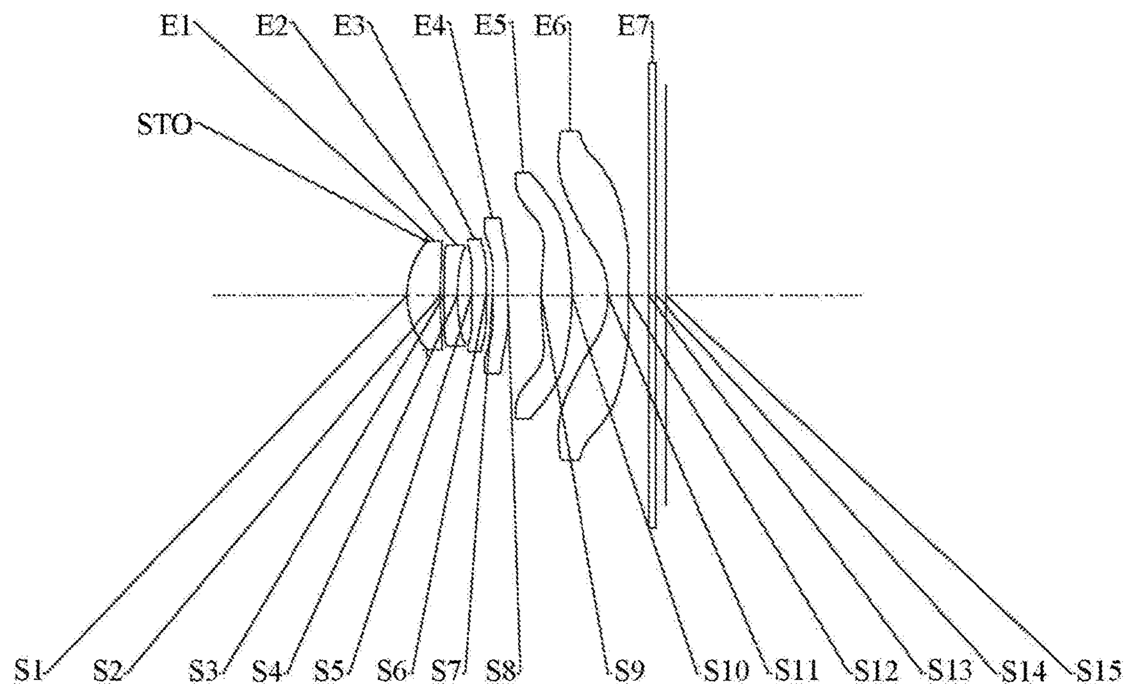
Fig. 13
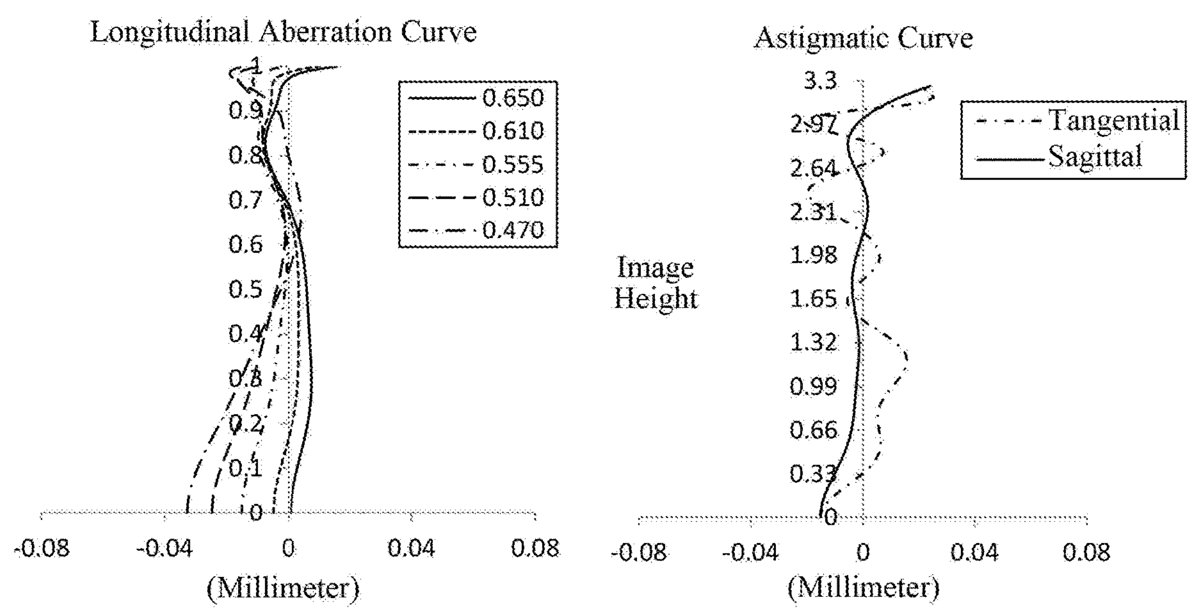
Fig. 14A
Fig. 14B

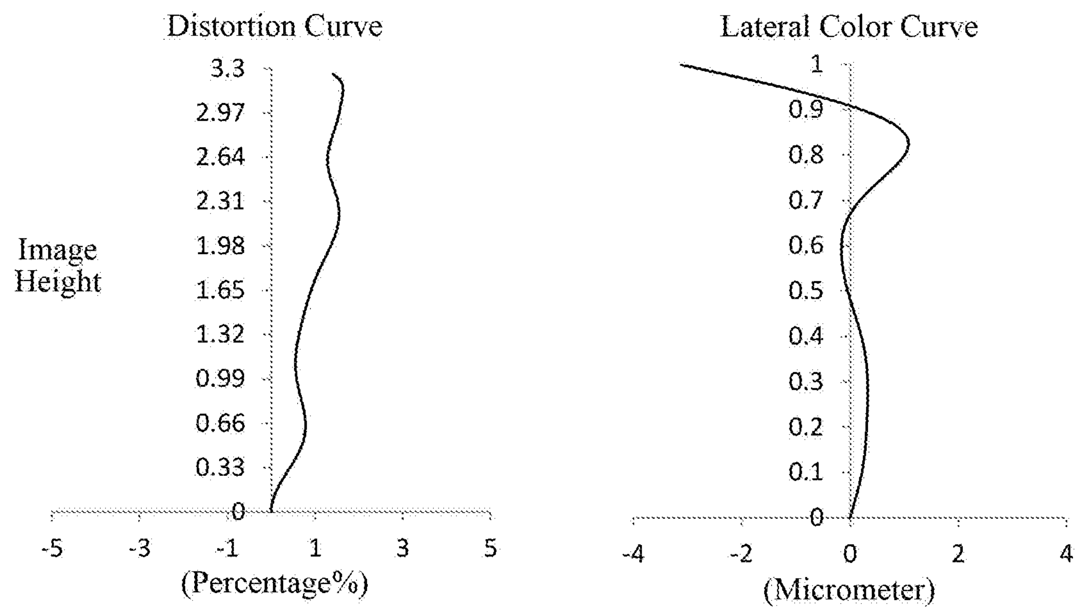
Fig. 14C
Fig. 14D
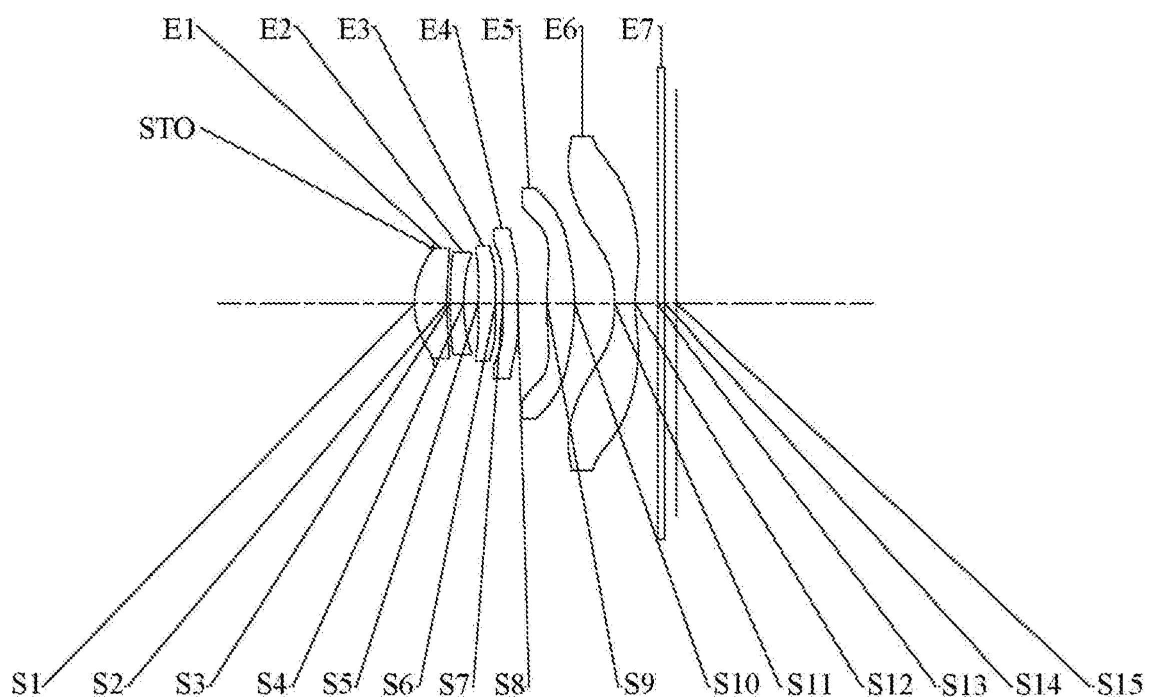
Fig. 15

OPTICAL IMAGING LENS GROUP

CROSS-REFERENCE TO RELATED APPLICATIONS

The present patent application is a continuation of International Application No. PCT/CN2019/099391, filed on Aug. 6, 2019, which claims priority to Chinese Patent Application No. 201811477440.0, filed before the China National Intellectual Property Administration (CNIPA) on Dec. 5, 2018. Both of the aforementioned patent applications are hereby incorporated by reference in their entireties.

TECHNICAL FIELD

The present disclosure relates to an optical imaging lens group, and more specifically, relates to an optical imaging lens group including eight lenses.

BACKGROUND

With the popularization of the full-screen technology of mobile phones, the optical system applicable to the mobile phones has also entered a new round of upgrading. Having large image area and ultra-short total system length has become a necessary condition for an optical system applicable to the full-screen mobile phone. At the same time, with the improvement of the performance of the image sensor and the reduction of the size thereof, the design freedom of the corresponding lens assembly is getting lower and lower, and the design difficulty is increasing day by day. Therefore, how to ensure the large image area characteristics of the optical system and compress the total length of the optical system to the applicable range without degrading the image quality of the mobile phone is a problem to be solved urgently.

SUMMARY

The present disclosure provides an optical imaging lens group that is applicable to portable electronic products and at least solves or partially solves at least one of the above disadvantages of the prior art.

The present disclosure provides an optical imaging lens group including, sequentially from an object side to an image side along an optical axis, a first lens, a second lens, a third lens, a fourth lens, a fifth lens, and a sixth lens, wherein each of the first through the sixth lenses has refractive power. An object-side surface of the first lens is a convex surface, and an image-side surface thereof is a concave surface. An image-side surface of the second lens is a concave surface. An object-side surface of the sixth lens is a concave surface.

In one embodiment, a distance TTL along the optical axis from an object-side surface of the first lens to an imaging plane of the optical imaging lens group and half of a diagonal length ImgH of an effective pixel area on the imaging plane of the optical imaging lens group satisfy $TTL/ImgH \leq 1.23$.

In one embodiment, an effective focal length f1 of the first lens and an effective focal length f6 of the sixth lens may satisfy $f1/|f6|<1.45$.

In one embodiment, a radius of curvature R1 of an object-side surface of the first lens and a radius of curvature R2 of an image-side surface of the first lens may satisfy $1.6<(R2+R1)/(R2-R1)<2.8$.

In one embodiment, a total effective focal length f of the optical imaging lens group, a radius of curvature R4 of an image-side surface of the second lens, and a radius of curvature R11 of an object-side surface of the sixth lens may satisfy $0.1<f/(|R4-R11|)<0.9$.

In one embodiment, an effective focal length f5 of the fifth lens and an effective focal length f2 of the second lens may satisfy $-0.6<(f5+f2)/(f5-f2)<0.6$.

In one embodiment, a center thickness CT5 of the fifth lens along the optical axis, a center thickness CT6 of the sixth lens along the optical axis, a spaced interval T45 between the fourth lens and the fifth lens along the optical axis, and a spaced interval T56 between the fifth lens and the sixth lens along the optical axis may satisfy $0.3<(CT5+CT6)/(T45+T56)<0.9$.

In one embodiment, a maximum effective radius DT61 of an object-side surface of the sixth lens and a maximum effective radius DT31 of an object-side surface of the third lens may satisfy $3.0<DT61/DT31<3.5$.

In one embodiment, a maximum effective radius DT42 of an image-side surface of the fourth lens, and a maximum effective radius DT32 of an image-side surface of the third lens may satisfy $1.1<DT42/DT32<1.6$.

In one embodiment, a center thickness CT3 of the third lens along the optical axis, a center thickness CT4 of the fourth lens along the optical axis, a radius of curvature R6 of an image-side surface of the third lens, and a radius of curvature R8 of an image-side surface of the fourth lens may satisfy $0<|CT3/R6+CT4/R8|*10<1.4$.

In one embodiment, half of a diagonal length ImgH of an effective pixel area on an imaging plane of the optical imaging lens group, a center thickness CT1 of the first lens along the optical axis, a center thickness CT2 of the second lens along the optical axis, a center thickness CT3 of the third lens along the optical axis, and a center thickness CT4 of the fourth lens along the optical axis may satisfy $2.5<ImgH/(CT1+CT2+CT3+CT4)<3.0$.

In one embodiment, an edge thickness ET2 of the second lens and a center thickness CT2 of the second lens along the optical axis may satisfy $0.9<ET2/CT2<1.4$.

In one embodiment, SAG11, being an on-axis distance from an intersection of an object-side surface of the first lens and the optical axis to a vertex of a maximum effective radius of the object-side surface of the first lens, and SAG12, being an on-axis distance from an intersection of an image-side surface of the first lens and the optical axis to a vertex of a maximum effective radius of the image-side surface of the first lens, may satisfy $0.3<(SAG11-SAG12)/(SAG11+SAG12)<0.9$.

In one embodiment, half of a maximum field-of-view Semi-FOV of the optical imaging lens group may satisfy $40°<Semi\text{-}FOV<50°$.

In one embodiment, a maximum incident angle CRAmax of the chief ray incident on an electronic photosensitive component of the optical imaging lens group may satisfy $35°<CRAmax<40°$.

The present disclosure employs six lenses. The above-mentioned optical imaging lens group has at least one beneficial effect, such as ultra-thin, large imaging plane and excellent imaging quality, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens group according to example 1 of the present disclosure;

FIGS. 2A to 2D illustrate a longitudinal aberration curve, an astigmatic curve, a distortion curve, and a lateral color curve of the optical imaging lens group of the example 1, respectively;

FIG. 5 illustrates a schematic structural view of an optical imaging lens group according to example 3 of the present disclosure;

FIGS. 6A to 6D illustrate a longitudinal aberration curve, an astigmatic curve, a distortion curve, and a lateral color curve of the optical imaging lens group of the example 3, respectively;

FIG. 9 illustrates a schematic structural view of an optical imaging lens group according to example 5 of the present disclosure;

FIGS. 10A to 10D illustrate a longitudinal aberration curve, an astigmatic curve, a distortion curve, and a lateral color curve of the optical imaging lens group of the example 5, respectively;

FIGS. 12A to 12D illustrate a longitudinal aberration curve, an astigmatic curve, a distortion curve, and a lateral color curve of the optical imaging lens group of the example 6, respectively;

FIG. 13 illustrates a schematic structural view of an optical imaging lens group according to example 7 of the present disclosure;

FIGS. 14A to 14D illustrate a longitudinal aberration curve, an astigmatic curve, a distortion curve, and a lateral color curve of the optical imaging lens group of the example 7, respectively;

FIG. 15 illustrates a schematic structural view of an optical imaging lens group according to example 8 of the present disclosure.

DETAILED DESCRIPTION OF EMBODIMENTS

Figure 2C:
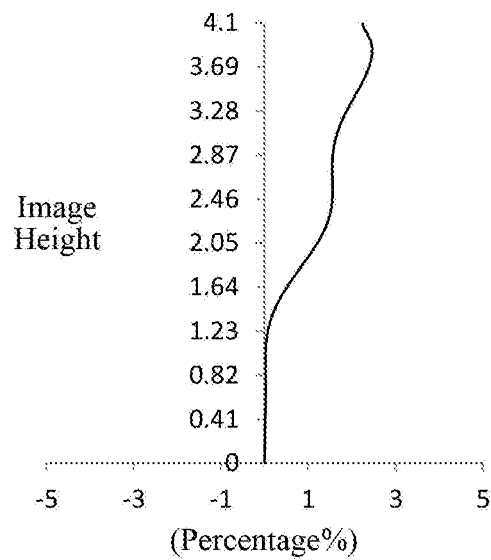

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens group according to an exemplary embodiment of the present disclosure may include, for example, six lenses (i.e. a first lens, a second lens, a third lens, a fourth lens, a fifth lens and a sixth lens). Each of the first to the sixth lenses has refractive power. The six lenses are arranged sequentially from an object side to an image side along an optical axis, and there may be an air interval between each two adjacent lenses.

In an exemplary embodiment, the first lens has refractive power, an object-side surface thereof may be a convex surface, and an image-side surface thereof may be a concave surface; the second lens has refractive power, and an image-side surface thereof may be a concave surface; the third lens has refractive power; the fourth lens has refractive power; the fifth lens has refractive power; and the sixth lens has refractive power, an object-side surface thereof may be a concave surface. A six-piece ultra-short camera lens assembly is provided by reasonably distributing the surface shape and refractive power of each lens.

In an exemplary embodiment, the first lens may have positive refractive power.

In an exemplary embodiment, the second lens may have negative refractive power.

In an exemplary embodiment, the fifth lens may have positive refractive power.

In an exemplary embodiment, the sixth lens may have negative refractive power.

In an exemplary embodiment, the optical imaging lens group according to the present disclosure may satisfy $TTL/ImgH \leq 1.23$, where TTL is a distance along the optical axis from an object-side surface of the first lens to an imaging plane of the optical imaging lens group, and ImgH is half of a diagonal length of an effective pixel area on the imaging plane of the optical imaging lens group. More specifically, TTL and ImgH may further satisfy $1.18 < TTL/ImgH \leq 1.23$. Satisfying the conditional $TTL/ImgH \leq 1.23$ is conducive to constraining the size of the optical system and enabling the optical system to have the characteristics of miniaturization and ultra-thin.

In an exemplary embodiment, the optical imaging lens group according to the present disclosure may satisfy $f1/|f6| < 1.45$, where f1 is an effective focal length of the first lens, and f6 is an effective focal length of the sixth lens. More specifically, f1 and f6 may further satisfy $0.75 < f1/|f6| < 1.38$. A reasonable distribution of the refractive power of the first lens and the sixth lens is beneficial to uniformly distributing the refractive power of the optical system.

In an exemplary embodiment, the optical imaging lens group according to the present disclosure may satisfy $1.6 < (R2+R1)/(R2-R1) < 2.8$, where R1 is a radius of curvature of an object-side surface of the first lens, and R2 is a radius of curvature of an image-side surface of the first lens. More specifically, R1 and R2 may further satisfy $1.63 < (R2+R1)/(R2-R1) < 2.79$. By reasonably constraining the surface shapes of the object-side surface and the image-side surface of the first lens to ensure the uniformity of the first lens, the first lens has a more reasonable manufacturability.

In an exemplary embodiment, the optical imaging lens group according to the present disclosure may satisfy $0.1 < f/(|R4-R11|) < 0.9$, where f is a total effective focal length of the optical imaging lens group, R4 is a radius of curvature of an image-side surface of the second lens, and R11 is a radius of curvature of an object-side surface of the sixth lens. More specifically, f, R4 and R11 may further satisfy $0.16 < f/(|R4-R11|) < 0.86$. Both the second lens and the sixth lens in the optical system can be negative lenses, which are used to diverge the light collected by the positive lens and have the effect of compensating the spherical aberration of the system. The conditional $0.1 < f/(|R4-R11|) < 0.9$ is used to constrain the aberration correction ability of the second lens and the sixth lens in the entire optical system.

In an exemplary embodiment, the optical imaging lens group according to the present disclosure may satisfy $-0.6 < (f5+f2)/(f5-f2) < 0.6$, where f5 is an effective focal length of the fifth lens, and f2 is an effective focal length of the second lens. More specifically, f5 and f2 may further satisfy $-0.42 < (f5+f2)/(f5-f2) < 0.50$. The first and second lenses form the first lens group, and the fifth and sixth lenses form the third lens group. The conditional expression $-0.6 < (f5+f2)/(f5-f2) < 0.6$ is used to constrain the refractive power assumed by the second and fifth lenses in the lens groups, and thereby play the role of correcting the aberrations of the optical system.

In an exemplary embodiment, the optical imaging lens group according to the present disclosure may satisfy $40° < \text{Semi-FOV} < 50°$, where Semi-FOV is half of a maximum field-of-view of the optical imaging lens group. More specifically, Semi-FOV may further satisfy $40.7° < \text{Semi-FOV} < 44.6°$. By constraining the viewing angle of the optical system, the optical system has a better imaging range while maintaining a small size.

In an exemplary embodiment, the optical imaging lens group according to the present disclosure may satisfy $0.3 < (CT5+CT6)/(T45+T56) < 0.9$, where CT5 is a center thickness of the fifth lens along the optical axis, CT6 is a center thickness of the sixth lens along the optical axis, T45 is a spaced interval between the fourth lens and the fifth lens along the optical axis, and T56 is a spaced interval between the fifth lens and the sixth lens along the optical axis. More specifically, CT5, CT6, T45 and T56 may further satisfy $0.35 < (CT5+CT6)/(T45+T56) < 0.84$. The fifth lens and the sixth lens are mainly used to adjust the curvature of field in the optical system, so that the optical system has a more uniform imaging effect. The conditional expression $0.3 < (CT5+CT6)/(T45+T56) < 0.9$ is mainly used to constrain the position and thickness of the last two lenses. Better optical performance can be obtained by controlling the conditional expression within a reasonable range.

In an exemplary embodiment, the optical imaging lens group according to the present disclosure may satisfy $3.0 < DT61/DT31 < 3.5$, where DT61 is a maximum effective radius of an object-side surface of the sixth lens, and DT31 is a maximum effective radius of an object-side surface of the third lens. More specifically, DT61 and DT31 may further satisfy $3.11 < DT61/DT31 < 3.48$. By controlling the maximum effective radii of the object-side surface of the sixth lens and the object-side surface of the third lens, the size of the rear end of the lens can be reduced, the light with poor imaging quality can be eliminated while ensuring the illuminance in the edge field-of-view, and the excellent imaging quality of the lens can be ensured.

In an exemplary embodiment, the optical imaging lens group according to the present disclosure may satisfy $1.1 < DT42/DT32 < 1.6$, where DT42 is a maximum effective radius of an image-side surface of the fourth lens, and DT32 is a maximum effective radius of an image-side surface of the third lens. More specifically, DT42 and DT32 may further satisfy $1.14 < DT42/DT32 < 1.59$. By reasonably constraining the effective clear apertures of the third lens and the fourth lens and controlling the conditional formula $1.1 < DT42/DT32 < 1.6$ within a reasonable range, it is possible to ensure the light transition smooth while reducing the design difficulty of lens structure.

In an exemplary embodiment, the optical imaging lens group according to the present disclosure may satisfy $0 < |CT3/R6+CT4/R8| * 10 < 1.4$, where CT3 is a center thickness of the third lens along the optical axis, CT4 is a center thickness of the fourth lens along the optical axis, R6 is a radius of curvature of an image-side surface of the third lens, and R8 is a radius of curvature of an image-side surface of the fourth lens. More specifically, CT3, CT4, R6 and R8 may further satisfy $0.004<|CT3/R6+CT4/R8|*10<1.340$. The third lens and the fourth lens form the second lens group of the optical system, which is mainly used in the optical system to compensate the aberrations generated by the first lens group composed of the first lens and the second lens. Controlling the conditional expression $0<|CT3/R6+CT4/R8|*10<1.4$ within an appropriate range can make the optical system have smaller aberrations and better image quality.

In an exemplary embodiment, the optical imaging lens group according to the present disclosure may satisfy $2.5<ImgH/(CT1+CT2+CT3+CT4)<3.0$, where ImgH is half of a diagonal length of an effective pixel area on an imaging plane of the optical imaging lens group, CT1 is a center thickness of the first lens along the optical axis, CT2 is a center thickness of the second lens along the optical axis, CT3 is a center thickness of the third lens along the optical axis, and CT4 is a center thickness of the fourth lens along the optical axis. More specifically, ImgH, CT1, CT2, CT3 and CT4 may further satisfy $2.57<ImgH/(CT1+CT2+CT3+CT4)<2.95$. This conditional expression restricts the ratio of the imaging size to the system space, so that the optical system has ultra-thin characteristics while ensuring the feasibility of the manufacturing process.

In an exemplary embodiment, the optical imaging lens group according to the present disclosure may satisfy $0.9<ET2/CT2<1.4$, where ET2 is an edge thickness of the second lens, and CT2 is a center thickness of the second lens along the optical axis. More specifically, ET2 and CT2 may further satisfy $1.08<ET2/CT2<1.36$. The second lens is mainly used to compensate the spherical aberration, chromatic aberration and dispersion generated by the first lens in the optical system. By constraining the edge thickness and center thickness of the second lens, the adjustment space of the second lens can be ensured within the process range, and the second lens has a higher applicability.

In an exemplary embodiment, the optical imaging lens group according to the present disclosure may satisfy $35°<CRAmax<40°$, where CRAmax is a maximum incident angle of a chief ray incident on an electronic photosensitive component of the optical imaging lens group. More specifically, CRAmax may further satisfy $36.00°<CRAmax<37.29°$. This conditional expression mainly reflects the matching between the optical system and the chip. The application specification of the chip requires that the incident light be within a certain angle range. If the incident angle exceeds this angle range, the image quality will be seriously degraded.

In an exemplary embodiment, the optical imaging lens group according to the present disclosure may satisfy $0.3<(SAG11-SAG12)/(SAG11+SAG12)<0.9$, where SAG11 is an on-axis distance from an intersection of an object-side surface of the first lens and the optical axis to a vertex of a maximum effective radius of the object-side surface of the first lens, and SAG12 is an on-axis distance from an intersection of an image-side surface of the first lens and the optical axis to a vertex of a maximum effective radius of the image-side surface of the first lens. More specifically, SAG11 and SAG12 may further satisfy $0.38<(SAG11-SAG12)/(SAG11+SAG12)<0.84$. The first lens is mainly used to collect light in the optical system. The optical system has the characteristics of large field of view and ultra-short system length. The conditional expression $0.3<(SAG11-SAG12)/(SAG11+SAG12)<0.9$ simultaneously constrains the object-side surface and image-side surface of the first lens. Controlling the conditional expression within an appropriate range can make the optical system have a strong light collection capability while ensuring the aberration compensation ability when used with the rear lenses.

In an exemplary embodiment, the above-mentioned optical imaging lens group may further include a stop to improve the image quality of the lens group. Optionally, the stop may be disposed between the object side and the first lens.

Optionally, the above-mentioned optical imaging lens group may further include an optical filter for correcting the color deviation and/or a protective glass for protecting the photosensitive element located on an imaging plane.

The optical imaging lens group according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the lens group may be effectively reduced, and the workability of the lens group may be improved, such that the optical imaging lens group is more advantageous for production processing and may be applied to portable electronic products. The optical imaging lens group configured as described above may also have beneficial effects such as ultra-thin, large imaging plane, and excellent imaging quality.

In the embodiments of the present disclosure, at least one of the surfaces of lenses is aspheric, that is, at least one of the object-side surface and the image-side surface of each of the first lens, the second lens, the third lens, the fourth lens, the fifth lens and the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens group may also include other numbers of lenses if desired.

Some specific examples of an optical imaging lens group applicable to the above embodiment will be further described below with reference to the accompanying drawings.

Example 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 1 shows surface type, radius of curvature, thickness, material and conic coefficient of each lens of the optical imaging lens group in example 1, wherein the units for the radius of curvature and the thickness are millimeter (mm).

TABLE 1

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.4436 | | | |
| S1 | Aspheric | 1.3660 | 0.6985 | 1.55 | 56.1 | −0.0052 |
| S2 | Aspheric | 5.1444 | 0.0951 | | | 0.0000 |
| S3 | Aspheric | −38.2483 | 0.2725 | 1.67 | 20.4 | 17.9820 |
| S4 | Aspheric | 7.1036 | 0.1937 | | | 7.9740 |
| S5 | Aspheric | 7.7629 | 0.2800 | 1.55 | 56.1 | −4.4768 |
| S6 | Aspheric | 6.5756 | 0.2257 | | | −0.7570 |
| S7 | Aspheric | −10.5877 | 0.2990 | 1.65 | 23.5 | 85.7620 |
| S8 | Aspheric | −6.9500 | 0.6097 | | | −97.8682 |
| S9 | Aspheric | 7.9887 | 0.4640 | 1.67 | 20.4 | 7.1754 |
| S10 | Aspheric | 14.0827 | 0.6203 | | | 16.7975 |
| S11 | Aspheric | −2.3773 | 0.5500 | 1.54 | 55.7 | −11.0070 |
| S12 | Aspheric | 61.4451 | 0.1495 | | | 9.0030 |
| S13 | Spherical | Infinite | 0.1100 | 1.52 | 64.2 | |
| S14 | Spherical | Infinite | 0.2660 | | | |
| S15 | Spherical | Infinite | | | | |

As can be seen from Table 1, both the object-side surface and the image-side surface of any one of the first lens E1 to the sixth lens E6 are aspheric. In this example, the surface shape x of each aspheric lens may be defined by using, but not limited to, the following aspheric formula:

$$X = \frac{ch^2}{1 + \sqrt{1 - (k+1)c^2h^2}} + \sum Aih^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 | A10 | A12 |
|---|---|---|---|---|---|
| S1 | −8.3500E−03 | 1.1026E−01 | −6.9197E−01 | 2.4816E+00 | −5.4173E+00 |
| S2 | −7.7800E−02 | 1.7922E−01 | −6.9534E−01 | 1.6663E+00 | −1.9136E+00 |
| S3 | −4.1210E−02 | 9.8340E−02 | 5.1509E−01 | −3.2478E+00 | 1.0033E+01 |
| S4 | −2.0980E−02 | 5.0136E−01 | −2.7444E+00 | 1.5053E+01 | −5.3903E+01 |
| S5 | −2.0202E−01 | 3.3617E−01 | −1.6836E+00 | 6.7484E+00 | −1.8856E+01 |
| S6 | −1.7958E−01 | 2.9551E−01 | −1.5876E+00 | 6.0703E+00 | −1.5444E+01 |
| S7 | −1.3207E−01 | 7.0415E−02 | 6.3512E−02 | −7.4845E−01 | 2.6013E+00 |
| S8 | −1.5162E−01 | 8.0239E−02 | 6.6547E−02 | −2.4494E−01 | 4.1685E−01 |
| S9 | −1.0637E−01 | −2.2410E−02 | −1.7390E−02 | 4.4904E−02 | −3.5940E−02 |
| S10 | −3.2300E−02 | −5.2710E−02 | 3.4669E−02 | −1.2030E−02 | 1.9470E−03 |
| S11 | −7.3990E−02 | 5.6457E−02 | −2.6220E−02 | 7.4910E−03 | −1.3300E−03 |
| S12 | −4.0220E−02 | 3.8090E−03 | 5.9040E−03 | −3.2600E−03 | 8.0500E−04 |

| Surface number | A14 | A16 | A18 | A20 |
|---|---|---|---|---|
| S1 | 7.3074E+00 | −5.9735E+00 | 2.7134E+00 | −5.3011E−01 |
| S2 | −1.5589E−01 | 2.8819E+00 | −2.8577E+00 | 9.1663E−01 |
| S3 | −1.8508E+01 | 2.0430E+01 | −1.2375E+01 | 3.1534E+00 |
| S4 | 1.2145E+02 | −1.6519E+02 | 1.2390E+02 | −3.9085E+01 |
| S5 | 3.3553E+01 | −3.5691E+01 | 2.0146E+01 | −4.3045E+00 |
| S6 | 2.4636E+01 | −2.3728E+01 | 1.2565E+01 | −2.7788E+00 |
| S7 | −5.0099E+00 | 5.4352E+00 | −3.1518E+00 | 7.5759E−01 |
| S8 | −3.8949E−01 | 1.9735E−01 | −5.1300E−02 | 5.3830E−03 |
| S9 | 1.7387E−02 | −4.9800E−03 | 7.5700E−04 | −4.7000E−05 |
| S10 | 2.6400E−04 | −2.0000E−04 | 3.9600E−05 | −2.7000E−06 |

TABLE 2-continued

| | | | | |
|---|---|---|---|---|
| S11 | 1.5000E−04 | −1.0000E−05 | 4.1700E−07 | −7.3000E−09 |
| S12 | −1.2000E−04 | 9.9400E−06 | −4.8000E−07 | 1.0100E−08 |

Table 3 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 1.

TABLE 3

| | | | |
|---|---|---|---|
| f1 (mm) | 3.19 | f6 (mm) | −4.25 |
| f2 (mm) | −8.95 | f (mm) | 4.57 |
| f3 (mm) | −85.82 | TTL (mm) | 4.83 |
| f4 (mm) | 30.38 | ImgH (mm) | 4.10 |
| f5 (mm) | 26.84 | | |

Figure 2D:
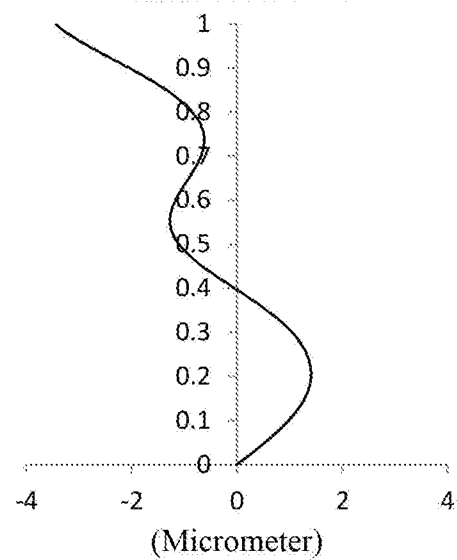

FIG. 2A illustrates a longitudinal aberration curve of the optical imaging lens group according to example 1, representing deviations of focal points converged by light of different wavelengths after passing through the lens group. FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion corresponding to different image heights. FIG. 2D illustrates a lateral color curve of the optical imaging lens group according to example 1, representing deviations of different image heights on an imaging plane after light passes through the lens group. It can be seen from FIG. 2A to FIG. 2D that the optical imaging lens group provided in example 1 may achieve good image quality.

Example 2

Figure 3:
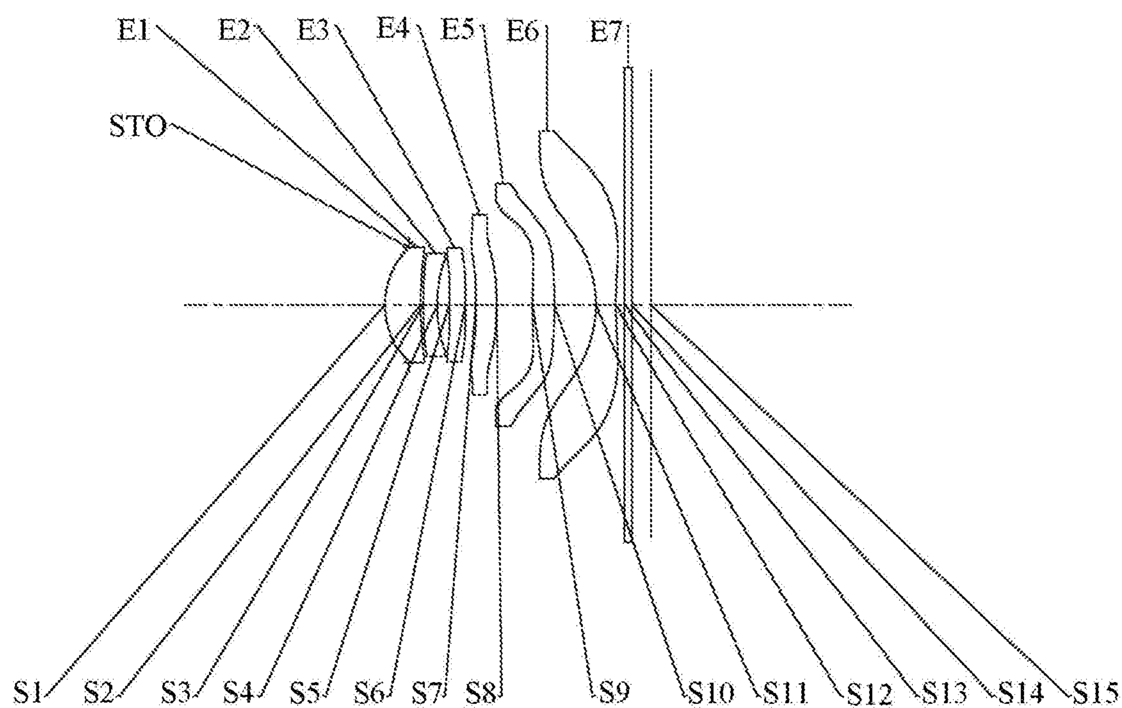
FIG. 3 illustrates a schematic structural view of an optical imaging lens group according to example 2 of the present disclosure.

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 4 shows surface type, radius of curvature, thickness, material and conic coefficient of each lens of the optical imaging lens group in example 2, wherein the units for the radius of curvature and the thickness are millimeter (mm).

TABLE 4

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.3563 | | | |
| S1 | Aspheric | 1.2303 | 0.5345 | 1.55 | 56.1 | 0.0000 |
| S2 | Aspheric | 5.1564 | 0.0396 | | | 0.0000 |
| S3 | Aspheric | 6.4276 | 0.2100 | 1.68 | 19.2 | 0.0000 |
| S4 | Aspheric | 2.4423 | 0.1802 | | | 0.0000 |
| S5 | Aspheric | 16.0176 | 0.2385 | 1.65 | 23.5 | 0.0000 |
| S6 | Aspheric | 22.0557 | 0.1575 | | | 0.0000 |
| S7 | Aspheric | −28.3158 | 0.3133 | 1.55 | 56.1 | 5.0000 |
| S8 | Aspheric | −5.8096 | 0.5379 | | | −89.8305 |
| S9 | Aspheric | 11.5543 | 0.3299 | 1.62 | 25.9 | −81.8297 |
| S10 | Aspheric | −5.2668 | 0.6203 | | | 4.0686 |
| S11 | Aspheric | −1.6814 | 0.2983 | 1.54 | 55.7 | −1.2068 |
| S12 | Aspheric | 5.1471 | 0.1300 | | | −76.0374 |
| S13 | Spherical | Infinite | 0.1100 | 1.52 | 64.2 | |
| S14 | Spherical | Infinite | 0.2900 | | | |
| S15 | Spherical | Infinite | | | | |

As can be seen from Table 4 that in example 2, both the object-side surface and the image-side surface of any one of the first lens E1 to the sixth lens E6 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 |
|---|---|---|---|---|---|
| S1 | 1.8730E−03 | 4.4254E−02 | −1.3456E−01 | 3.8559E−01 | −6.5329E−01 |
| S2 | −1.5523E−01 | 6.3307E−01 | −2.2047E+00 | 8.6274E+00 | −2.5692E+01 |
| S3 | −1.5547E−01 | 7.1096E−01 | −1.2316E+00 | 9.0981E−01 | 9.1265E−01 |
| S4 | −1.9460E−02 | 5.7422E−01 | −1.9281E+00 | 7.0202E+00 | −1.9711E+01 |
| S5 | −2.1955E−01 | 4.3634E−01 | −3.4249E+00 | 1.7695E+01 | −5.9219E+01 |

TABLE 5-continued

| | | | | | |
|---|---|---|---|---|---|
| S6 | −2.3572E−01 | 2.7717E−01 | −1.0393E+00 | 3.0164E+00 | −5.6586E+00 |
| S7 | −1.8044E−01 | −1.2033E−01 | 1.1802E+00 | −3.8118E+00 | 8.0765E+00 |
| S8 | −1.7320E−01 | −5.3090E−02 | 5.6184E−01 | −1.4150E+00 | 2.3968E+00 |
| S9 | 1.7440E−02 | −1.0564E−01 | −2.0867E−01 | 5.4030E−01 | −6.6241E−01 |
| S10 | 1.4545E−01 | −1.6335E−01 | −1.4235E−01 | 4.1133E−01 | −4.3766E−01 |
| S11 | 8.2897E−02 | −1.9125E−01 | 1.5809E−01 | −6.6860E−02 | 1.7382E−02 |
| S12 | −3.1090E−02 | −2.1820E−02 | 1.2666E−02 | −1.3200E−03 | −7.0000E−04 |

| Surface number | A14 | A16 | A18 | A20 |
|---|---|---|---|---|
| S1 | 6.4785E−01 | −2.6891E−01 | 0.0000E+00 | 0.0000E+00 |
| S2 | 4.6242E+01 | −4.3912E+01 | 1.6616E+01 | 0.0000E+00 |
| S3 | −3.0463E+00 | 3.9850E+00 | −2.6682E+00 | 0.0000E+00 |
| S4 | 3.6729E+01 | −3.7226E+01 | 1.6226E+01 | 0.0000E+00 |
| S5 | 1.1677E+02 | −1.1864E+02 | 4.0068E+01 | 1.2988E+01 |
| S6 | 6.7556E+00 | −3.7314E+00 | 5.4310E−01 | 0.0000E+00 |
| S7 | −9.8408E+00 | 6.6426E+00 | −2.3186E+00 | 3.2582E−01 |
| S8 | −2.3550E+00 | 1.2822E+00 | −3.6141E−01 | 4.1179E−02 |
| S9 | 4.6630E−01 | −1.8855E−01 | 4.1777E−02 | −4.0200E−03 |
| S10 | 2.6106E−01 | −8.8460E−02 | 1.5817E−02 | −1.1600E−03 |
| S11 | −2.9500E−03 | 3.2400E−04 | −2.1000E−05 | 6.1300E−07 |
| S12 | 2.2900E−04 | −2.5000E−05 | 9.8200E−07 | 1.0100E−09 |

Table 6 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 2.

TABLE 6

| | | | |
|---|---|---|---|
| f1 (mm) | 2.82 | f6 (mm) | −2.33 |
| f2 (mm) | −5.94 | f (mm) | 3.56 |
| f3 (mm) | 89.39 | TTL (mm) | 3.99 |
| f4 (mm) | 13.32 | ImgH (mm) | 3.36 |
| f5 (mm) | 5.89 | | |

Figure 4A:
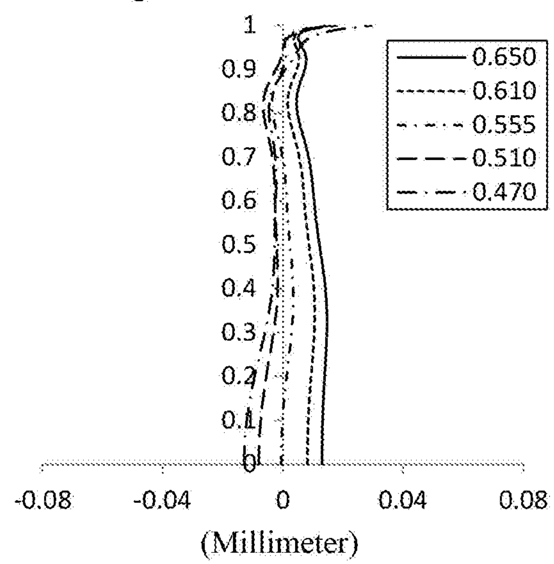
FIGS. 4A to 4D illustrate a longitudinal aberration curve, an astigmatic curve, a distortion curve, and a lateral color curve of the optical imaging lens group of the example 2, respectively.
Figure 4B:
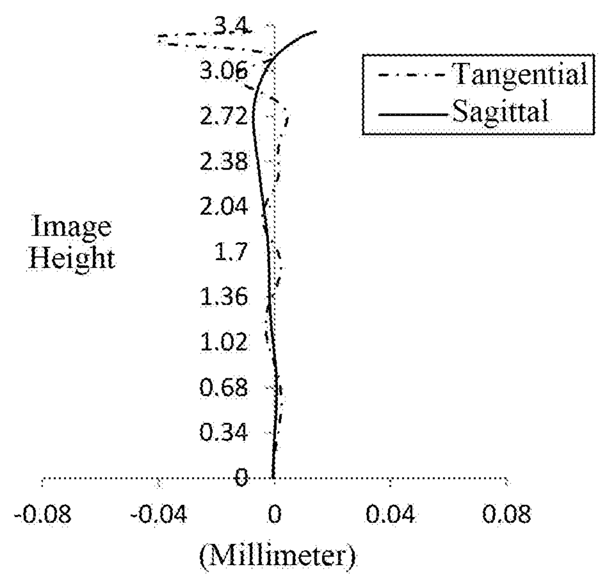
Figure 4C:
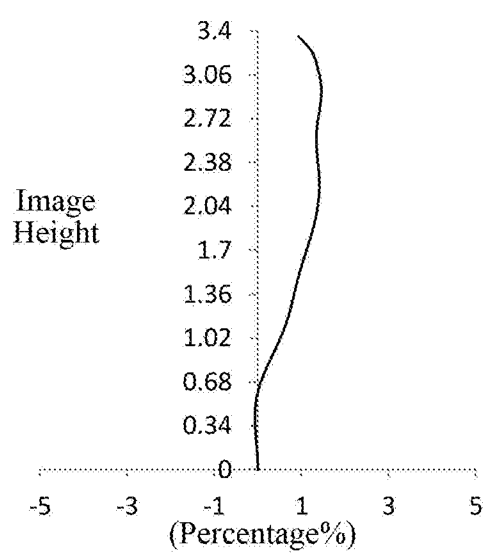
Figure 4D:
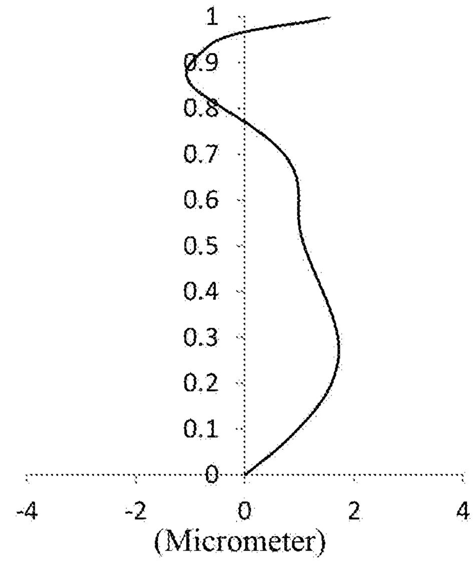

FIG. 4A illustrates a longitudinal aberration curve of the optical imaging lens group according to example 2, representing deviations of focal points converged by light of different wavelengths after passing through the lens group. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion corresponding to different image heights. FIG. 4D illustrates a lateral color curve of the optical imaging lens group according to example 2, representing deviations of different image heights on an imaging plane after light passes through the lens group. It can be seen from FIG. 4A to FIG. 4D that the optical imaging lens group provided in example 2 may achieve good image quality.

Example 3

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 7 shows surface type, radius of curvature, thickness, material and conic coefficient of each lens of the optical imaging lens group in example 3, wherein the units for the radius of curvature and the thickness are millimeter (mm).

TABLE 7

| | | | | Material | | |
|---|---|---|---|---|---|---|
| Surface number | Surface type | Radius of curvature | Thick-ness | Refrac-tive index | Abbe number | Conic coefficient |
| OBJ | Spherical | Infinite | Infinite | | | |
| STO | Spherical | Infinite | −0.2908 | | | |
| S1 | Aspheric | 1.3164 | 0.4964 | 1.55 | 56.1 | −0.4716 |
| S2 | Aspheric | 4.7619 | 0.0495 | | | 1.6216 |
| S3 | Aspheric | 5.2632 | 0.2100 | 1.68 | 19.2 | 0.0000 |
| S4 | Aspheric | 2.8538 | 0.2341 | | | −7.1758 |
| S5 | Aspheric | 33.3333 | 0.2837 | 1.55 | 56.1 | −62.9250 |
| S6 | Aspheric | 21.5583 | 0.1050 | | | 86.7202 |
| S7 | Aspheric | 7.1429 | 0.2100 | 1.68 | 19.2 | 0.0000 |
| S8 | Aspheric | 6.9445 | 0.3838 | | | 0.0000 |
| S9 | Aspheric | 5.7348 | 0.4017 | 1.55 | 56.1 | 12.6087 |
| S10 | Aspheric | −3.2364 | 0.6587 | | | −15.7575 |
| S11 | Aspheric | −3.8822 | 0.3150 | 1.55 | 56.1 | −1.2121 |

TABLE 7-continued

| Surface number | Surface type | Radius of curvature | Thick-ness | Material | | Conic coefficient |
|---|---|---|---|---|---|---|
| | | | | Refrac-tive index | Abbe number | |
| S12 | Aspheric | 2.0222 | 0.3548 | | | −18.5164 |
| S13 | Spherical | Infinite | 0.1100 | 1.52 | 64.2 | |
| S14 | Spherical | Infinite | 0.1871 | | | |
| S15 | Spherical | Infinite | | | | |

As can be seen from Table 7 that in example 3, both the object-side surface and the image-side surface of any one of the first lens E1 to the sixth lens E6 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 |
|---|---|---|---|---|---|
| S1 | 1.1595E−02 | 2.2831E−01 | −1.9058E+00 | 1.0141E+01 | −3.4164E+01 |
| S2 | −1.9562E−01 | 1.6084E−01 | 1.0740E+00 | −4.6725E+00 | 6.3674E+00 |
| S3 | −2.2665E−01 | 2.9939E−01 | 1.8694E+00 | −1.0512E+01 | 2.7749E+01 |
| S4 | −5.5100E−02 | 7.3020E−01 | −5.5527E+00 | 4.1088E+01 | −1.8941E+02 |
| S5 | −1.5980E−01 | 8.5432E−01 | −8.6785E+00 | 5.2193E+01 | −2.0278E+02 |
| S6 | −4.1549E−01 | 1.7087E+00 | −7.2992E+00 | 2.1328E+01 | −4.3109E+01 |
| S7 | −7.6234E−01 | 2.1937E+00 | −7.6379E+00 | 2.3545E+01 | −5.5335E+01 |
| S8 | −6.0567E−01 | 1.3700E+00 | −4.1268E+00 | 1.0992E+01 | −2.1071E+01 |
| S9 | −7.3540E−02 | −3.2681E−01 | 1.1089E+00 | −2.1328E+00 | 2.4009E+00 |
| S10 | 1.7656E−02 | −2.6645E−01 | 7.3593E−01 | −1.0405E+00 | 8.4053E−01 |
| S11 | −4.4480E−01 | 4.2902E−01 | −2.0756E−01 | 6.2284E−02 | −1.2020E−02 |
| S12 | −2.4119E−01 | 2.1072E−01 | −1.2235E−01 | 4.7187E−02 | −1.1910E−02 |

| Surface number | A14 | A16 | A18 | A20 |
|---|---|---|---|---|
| S1 | 7.2693E+01 | −9.4651E+01 | 6.8552E+01 | −2.1149E+01 |
| S2 | 6.4746E+00 | −3.4127E+01 | 4.3716E+01 | −1.9694E+01 |
| S3 | −4.0267E+01 | 2.6752E+01 | 1.3531E+00 | −7.9088E+00 |
| S4 | 5.3108E+02 | −8.8533E+02 | 8.0743E+02 | −3.0909E+02 |
| S5 | 4.9489E+02 | −7.3063E+02 | 5.9059E+02 | −1.9740E+02 |
| S6 | 5.4524E+01 | −3.8483E+01 | 1.1188E+01 | 6.1570E−01 |
| S7 | 8.8403E+01 | −8.8716E+01 | 5.0733E+01 | −1.2777E+01 |
| S8 | 2.6580E+01 | −2.0216E+01 | 8.2947E+00 | −1.4051E+00 |
| S9 | −1.6902E+00 | 7.3077E−01 | −1.7485E−01 | 1.7530E−02 |
| S10 | −4.0871E−01 | 1.1908E−01 | −1.9250E−02 | 1.3320E−03 |
| S11 | 1.4660E−03 | −1.0000E−04 | 3.6600E−06 | −3.2000E−08 |
| S12 | 1.8800E−03 | −1.7000E−04 | 8.1300E−06 | −1.4000E−07 |

Table 9 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 3.

TABLE 9

| | | | |
|---|---|---|---|
| f1 (mm) | 3.17 | f6 (mm) | −2.39 |
| f2 (mm) | −9.54 | f (mm) | 3.50 |
| f3 (mm) | −112.74 | TTL (mm) | 4.00 |
| f4 (mm) | −644.80 | ImgH (mm) | 3.26 |
| f5 (mm) | 3.85 | | |

Figure 6C:
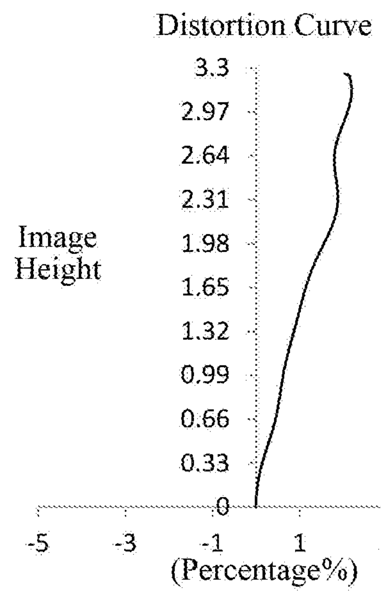
Figure 6D:
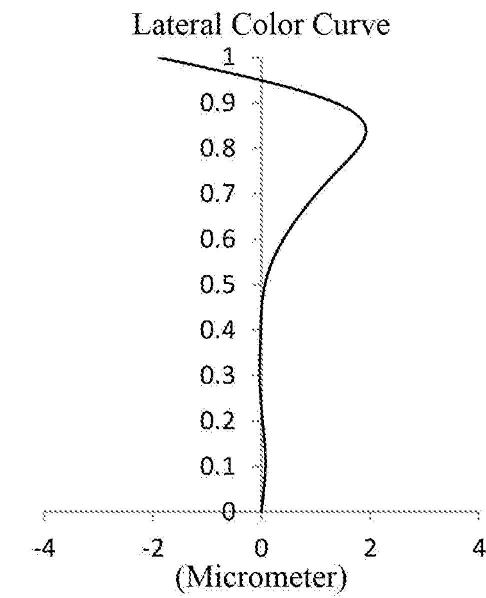

FIG. 6A illustrates a longitudinal aberration curve of the optical imaging lens group according to example 3, representing deviations of focal points converged by light of different wavelengths after passing through the lens group. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion corresponding to different image heights. FIG. 6D illustrates a lateral color curve of the optical imaging lens group according to example 3, representing deviations of different image heights on an imaging plane after light passes through the lens group. It can be seen from FIG. 6A to FIG. 6D that the optical imaging lens group provided in example 3 may achieve good image quality.

Example 4

Figure 7:
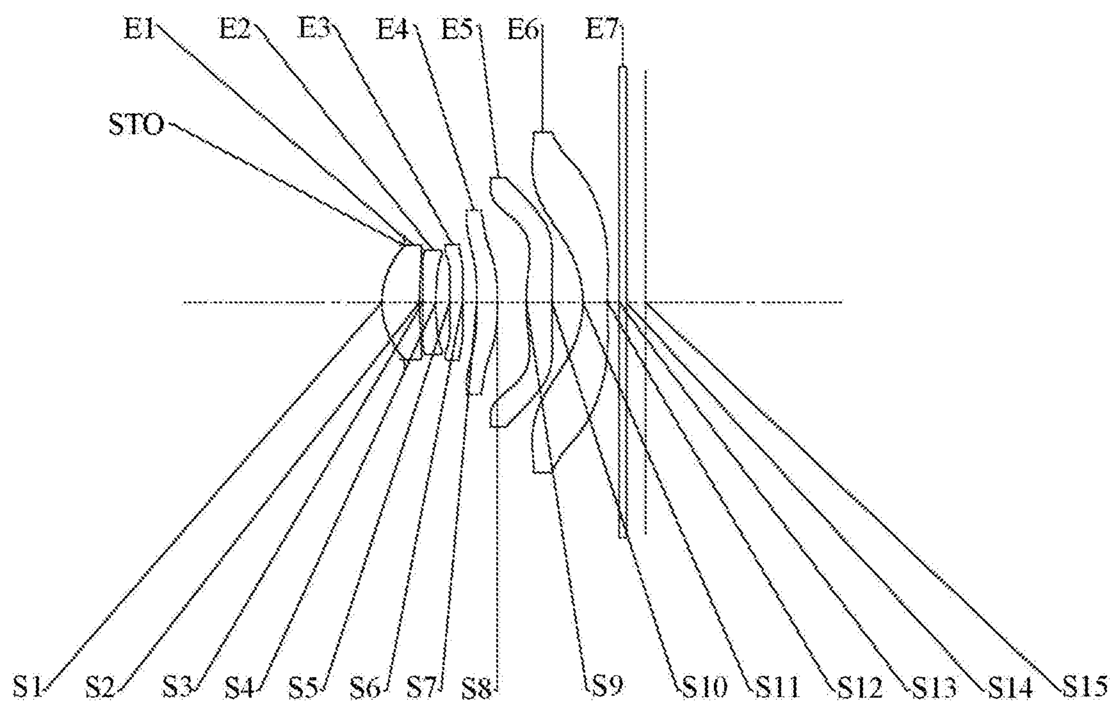
FIG. 7 illustrates a schematic structural view of an optical imaging lens group according to example 4 of the present disclosure.

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 10 shows surface type, radius of curvature, thickness, material and conic coefficient of each lens of the optical imaging lens group in example 4, wherein the units for the radius of curvature and the thickness are millimeter (mm).

TABLE 10

| Surface number | Surface type | Radius of curvature | Thickness | Material: Refractive index | Material: Abbe number | Conic coefficient |
|---|---|---|---|---|---|---|
| OBJ | Spherical | Infinite | Infinite | | | |
| STO | Spherical | Infinite | −0.3419 | | | |
| S1 | Aspheric | 1.2221 | 0.5707 | 1.55 | 56.1 | 0.0000 |
| S2 | Aspheric | 5.0658 | 0.0494 | | | 0.0000 |
| S3 | Aspheric | −2719.9000 | 0.2000 | 1.68 | 19.2 | 0.0000 |
| S4 | Aspheric | 5.0174 | 0.2097 | | | 0.0000 |
| S5 | Aspheric | 8.2712 | 0.1930 | 1.65 | 23.5 | 0.0000 |
| S6 | Aspheric | 7.5193 | 0.2178 | | | 0.0000 |
| S7 | Aspheric | −11.4739 | 0.3121 | 1.55 | 56.1 | 87.2216 |
| S8 | Aspheric | −5.7273 | 0.4385 | | | −0.7093 |
| S9 | Aspheric | 3.3113 | 0.3864 | 1.62 | 25.9 | −50.4493 |
| S10 | Aspheric | −1000.0000 | 0.4712 | | | 95.0000 |
| S11 | Aspheric | −1.5533 | 0.3739 | 1.54 | 55.7 | −1.3536 |
| S12 | Aspheric | 8.4165 | 0.1753 | | | −29.5355 |
| S13 | Spherical | Infinite | 0.1100 | 1.52 | 64.2 | |
| S14 | Spherical | Infinite | 0.2900 | | | |
| S15 | Spherical | Infinite | | | | |

As can be seen from Table 10 that in example 4, both the object-side surface and the image-side surface of any one of the first lens E1 to the sixth lens E6 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 |
|---|---|---|---|---|---|
| S1 | −4.5000E−03 | 7.3321E−02 | −3.6423E−01 | 1.0440E+00 | −1.7462E+00 |
| S2 | −1.7355E−01 | 1.4567E−01 | 9.3076E−01 | −5.0465E+00 | 1.3589E+01 |
| S3 | −1.5038E−01 | 5.4654E−01 | 2.7515E−01 | −4.6860E+00 | 1.4640E+01 |
| S4 | −1.2300E−02 | 3.6608E−01 | 1.5476E+00 | −1.3306E+01 | 4.8054E+01 |
| S5 | −3.2221E−01 | −2.2950E−02 | 3.7669E+00 | −3.2295E+01 | 1.3054E+02 |
| S6 | −2.8190E−01 | 4.5036E−02 | 1.6217E+00 | −9.9876E+00 | 2.8706E+01 |
| S7 | −2.2353E−01 | 7.7497E−02 | 7.6465E−01 | −2.9713E+00 | 6.3319E+00 |
| S8 | −2.4112E−01 | 2.3427E−02 | 6.3391E−01 | −1.8355E+00 | 3.1419E+00 |
| S9 | 1.1462E−01 | −4.0166E−01 | 3.3040E−01 | −1.4451E−01 | −2.6490E−02 |
| S10 | 1.3545E−01 | −2.3856E−01 | 1.9470E−02 | 1.8897E−01 | −2.1990E−01 |
| S11 | −1.9210E−02 | −7.3800E−03 | 6.7610E−03 | 1.0875E−02 | −8.8600E−03 |
| S12 | −1.4142E−01 | 9.1100E−02 | −5.4660E−02 | 2.6391E−02 | −8.4900E−03 |

| Surface number | A14 | A16 | A18 | A20 |
|---|---|---|---|---|
| S1 | 1.5398E+00 | −6.4253E−01 | 0.0000E+00 | 0.0000E+00 |
| S2 | −2.2593E+01 | 2.1555E+01 | −8.9596E+00 | 0.0000E+00 |
| S3 | −2.5200E+01 | 2.5036E+01 | −1.0874E+01 | 0.0000E+00 |
| S4 | −9.7270E+01 | 1.0738E+02 | −4.8970E+01 | 0.0000E+00 |
| S5 | −2.9213E+02 | 3.4666E+02 | −1.7558E+02 | 9.6730E+00 |
| S6 | −4.5439E+01 | 3.8251E+01 | −1.3031E+01 | 0.0000E+00 |
| S7 | −7.8353E+00 | 5.5704E+00 | −2.1196E+00 | 3.3589E−01 |
| S8 | −3.0357E+00 | 1.6183E+00 | −4.4686E−01 | 5.0076E−02 |
| S9 | 6.2546E−02 | −2.7180E−02 | 5.0580E−03 | −3.6000E−04 |
| S10 | 1.2393E−01 | −3.8120E−02 | 6.0920E−03 | −4.0000E−04 |
| S11 | 2.7930E−03 | −4.6000E−04 | 3.8400E−05 | −1.3000E−06 |
| S12 | 1.6500E−03 | −1.8000E−04 | 1.0800E−05 | −2.5000E−07 |

Table 12 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 4.

TABLE 12

| | | | |
|---|---|---|---|
| f1 (mm) | 2.80 | f6 (mm) | −2.41 |
| f2 (mm) | −7.39 | f (mm) | 3.55 |
| f3 (mm) | −142.67 | TTL (mm) | 4.00 |
| f4 (mm) | 20.55 | ImgH (mm) | 3.30 |
| f5 (mm) | 5.33 | | |

Figure 8A:
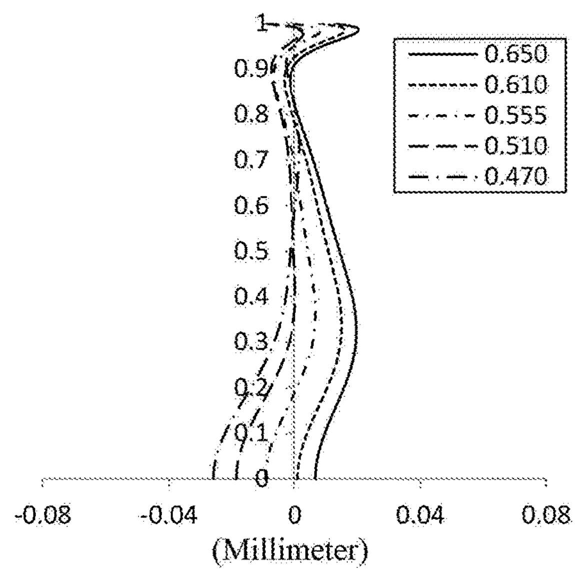
FIGS. 8A to 8D illustrate a longitudinal aberration curve, an astigmatic curve, a distortion curve, and a lateral color curve of the optical imaging lens group of the example 4, respectively.
Figure 8B:
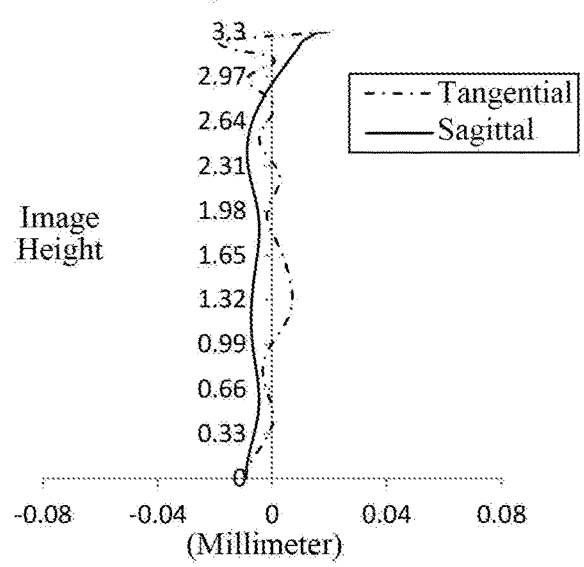
Figure 8C:
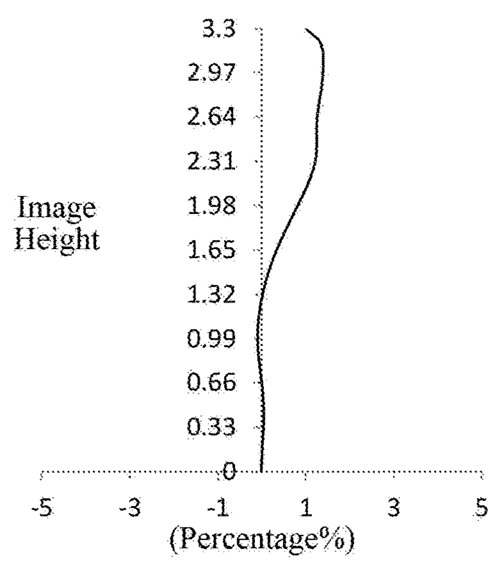
Figure 8D:
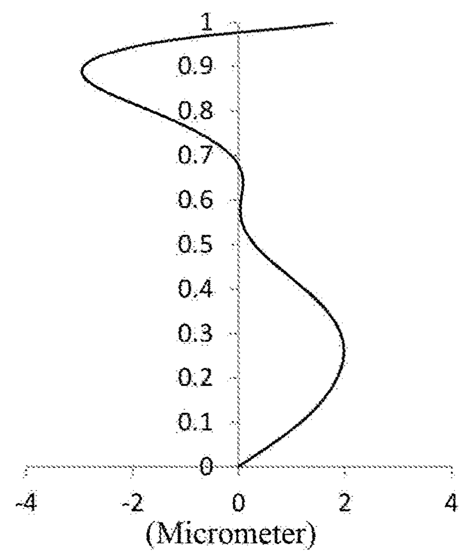

FIG. 8A illustrates a longitudinal aberration curve of the optical imaging lens group according to example 4, representing deviations of focal points converged by light of different wavelengths after passing through the lens group. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion corresponding to different image heights. FIG. 8D illustrates a lateral color curve of the optical imaging lens group according to example 4, representing deviations of different image heights on an imaging plane after light passes through the lens group. It can be seen from FIG. 8A to FIG. 8D that the optical imaging lens group provided in example 4 may achieve good image quality.

Example 5

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 13 shows surface type, radius of curvature, thickness, material and conic coefficient of each lens of the optical imaging lens group in example 5, wherein the units for the radius of curvature and the thickness are millimeter (mm).

TABLE 13

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.3489 | | | |
| S1 | Aspheric | 1.1987 | 0.5730 | 1.55 | 56.1 | 0.0000 |
| S2 | Aspheric | 4.8663 | 0.0776 | | | 0.0000 |
| S3 | Aspheric | −6.9424 | 0.2000 | 1.68 | 19.2 | 0.0000 |
| S4 | Aspheric | 20.9740 | 0.1867 | | | 0.0000 |
| S5 | Aspheric | 8.6008 | 0.1930 | 1.65 | 23.5 | 0.0000 |
| S6 | Aspheric | 9.2638 | 0.3054 | | | 0.0000 |
| S7 | Aspheric | −7.0325 | 0.3260 | 1.55 | 56.1 | −28.5826 |
| S8 | Aspheric | −4.7042 | 0.3929 | | | −24.1605 |
| S9 | Aspheric | 3.8909 | 0.3830 | 1.62 | 25.9 | −51.0860 |
| S10 | Aspheric | −5918.0900 | 0.4989 | | | 95.0000 |
| S11 | Aspheric | −1.4317 | 0.3579 | 1.54 | 55.7 | −1.4223 |
| S12 | Aspheric | 15.3610 | 0.1037 | | | 21.4768 |
| S13 | Spherical | Infinite | 0.1100 | 1.52 | 64.2 | |
| S14 | Spherical | Infinite | 0.2900 | | | |
| S15 | Spherical | Infinite | | | | |

As can be seen from Table 13 that in example 5, both the object-side surface and the image-side surface of any one of the first lens E1 to the sixth lens E6 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 |
|---|---|---|---|---|---|
| S1 | 1.7420E−03 | 3.2470E−02 | −1.4654E−01 | 4.4321E−01 | −8.4892E−01 |
| S2 | −8.8840E−02 | 3.3112E−02 | 1.0195E−01 | −7.3589E−01 | 1.8591E+00 |
| S3 | −1.5650E−02 | 3.1298E−01 | −2.5120E−02 | −1.7422E+00 | 6.1245E+00 |
| S4 | 2.7343E−02 | 6.0520E−01 | −1.7213E+00 | 6.7759E+00 | −2.0425E+01 |
| S5 | −3.7574E−01 | 9.3332E−01 | −8.8647E+00 | 5.9878E+01 | −2.6914E+02 |
| S6 | −2.6119E−01 | 6.8376E−02 | 4.0562E−01 | −2.7361E+00 | 7.8886E+00 |
| S7 | −1.0589E−01 | −2.8923E−01 | 1.1283E+00 | −2.0649E+00 | 1.9843E+00 |
| S8 | −1.0947E−01 | −4.3249E−01 | 1.5679E+00 | −3.0192E+00 | 3.8201E+00 |
| S9 | 1.5152E−01 | −5.0214E−01 | 5.4351E−01 | −4.0432E−01 | 1.8804E−01 |
| S10 | 1.8195E−01 | −3.8907E−01 | 3.0654E−01 | −1.4140E−01 | 2.6039E−02 |
| S11 | −1.9220E−02 | −2.4880E−02 | 4.0093E−02 | −1.6210E−02 | 2.9190E−03 |
| S12 | −1.4669E−01 | 8.9540E−02 | −4.2960E−02 | 1.6351E−02 | −4.4500E−03 |

| Surface number | A14 | A16 | A18 | A20 |
|---|---|---|---|---|
| S1 | 8.9183E−01 | −5.0150E−01 | 0.0000E+00 | 0.0000E+00 |
| S2 | −3.3262E+00 | 4.2613E+00 | −2.4589E+00 | 0.0000E+00 |
| S3 | −1.1413E+01 | 1.2794E+01 | −6.1219E+00 | 0.0000E+00 |
| S4 | 3.9329E+01 | −4.1265E+01 | 1.9381E+01 | 0.0000E+00 |
| S5 | 7.7184E+02 | −1.3602E+03 | 1.3414E+03 | −5.6621E+02 |
| S6 | −1.2368E+01 | 1.0468E+01 | −3.5156E+00 | 0.0000E+00 |
| S7 | −3.9906E−01 | −9.7818E−01 | 8.1985E−01 | −1.9543E−01 |
| S8 | −3.0113E+00 | 1.4000E+00 | −3.5096E−01 | 3.6595E−02 |
| S9 | −4.7660E−02 | 4.8390E−03 | 2.8400E−04 | −7.6000E−05 |
| S10 | 7.6870E−03 | −5.1400E−03 | 1.0220E−03 | −7.2000E−05 |
| S11 | −1.8000E−04 | −1.8000E−05 | 3.3400E−06 | −1.5000E−07 |
| S12 | 7.5700E−04 | −7.3000E−05 | 3.4400E−06 | −5.5000E−08 |

Table 15 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 5.

TABLE 15

| | | | |
|---|---|---|---|
| f1 (mm) | 2.76 | f6 (mm) | −2.42 |
| f2 (mm) | −7.68 | f (mm) | 3.56 |
| f3 (mm) | 167.34 | TTL (mm) | 4.00 |
| f4 (mm) | 24.80 | ImgH (mm) | 3.32 |
| f5 (mm) | 6.28 | | |

Figure 10C:
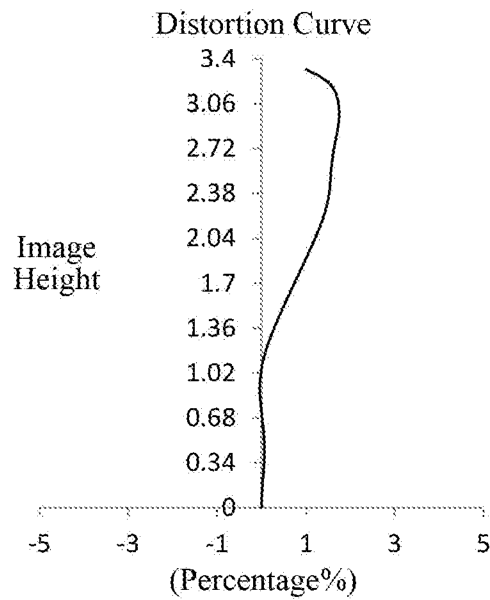
Figure 10D:
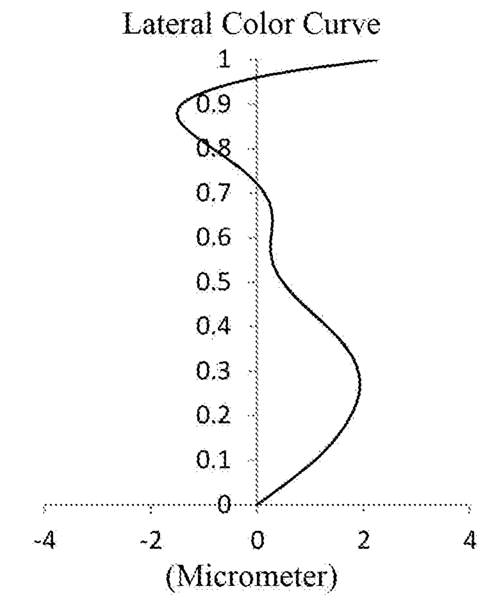

FIG. 10A illustrates a longitudinal aberration curve of the optical imaging lens group according to example 5, representing deviations of focal points converged by light of different wavelengths after passing through the lens group. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion corresponding to different image heights. FIG. 10D illustrates a lateral color curve of the optical imaging lens group according to example 5, representing deviations of different image heights on an imaging plane after light passes through the lens group. It can be seen from FIG. 10A to FIG. 10D that the optical imaging lens group provided in example 5 may achieve good image quality.

Example 6

Figure 11:
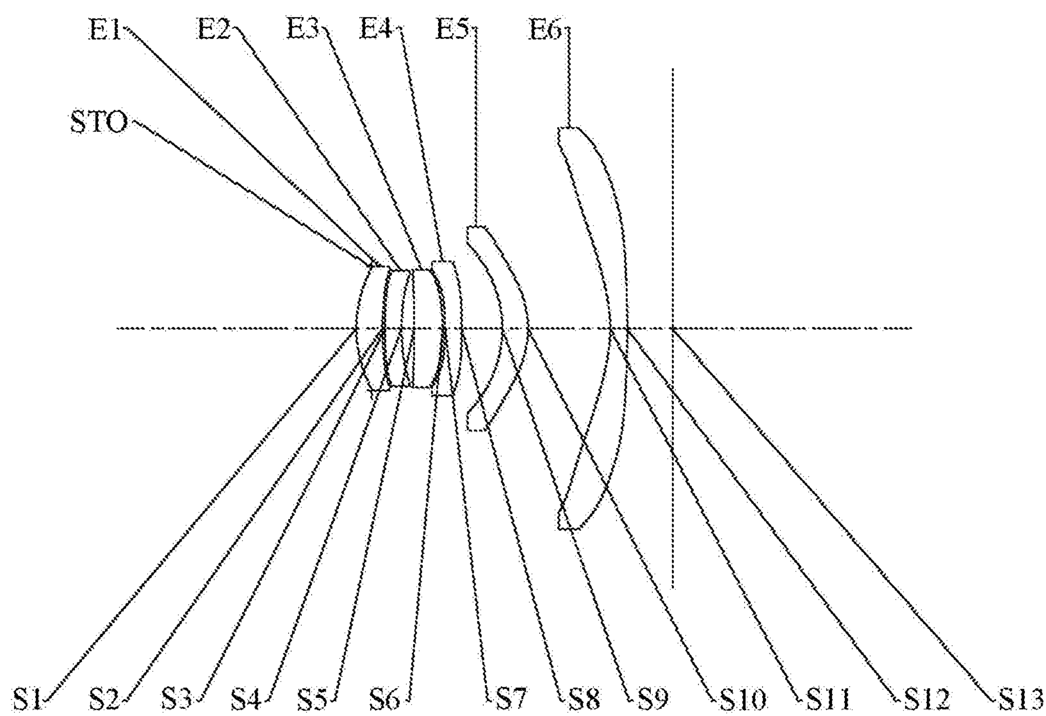
FIG. 11 illustrates a schematic structural view of an optical imaging lens group according to example 6 of the present disclosure.

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group according to an exemplary embodiment of the present disclosure includes a stop STO, a first lens E1, a second lens E2, a third lens E3, a fourth lens E4, a fifth lens E5, a sixth lens E6 and an imaging plane S13, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a concave surface, and an image-side surface S12 thereof is a convex surface. Light from an object sequentially passes through the respective surfaces S1 to S12 and is finally imaged on the imaging plane S13.

Table 16 shows surface type, radius of curvature, thickness, material and conic coefficient of each lens of the optical imaging lens group in example 6, wherein the units for the radius of curvature and the thickness are millimeter (mm).

TABLE 16

| Surface number | Surface type | Radius of curvature | Thick-ness | Material | | Conic coefficient |
|---|---|---|---|---|---|---|
| | | | | Refrac-tive index | Abbe number | |
| OBJ | Spherical | Infinite | Infinite | | | |
| STO | Spherical | Infinite | −0.1908 | | | |
| S1 | Aspheric | 1.5403 | 0.3301 | 1.77 | 50.5 | 0.0000 |
| S2 | Aspheric | 3.2640 | 0.0300 | | | 0.0000 |
| S3 | Aspheric | 4.7131 | 0.2100 | 1.63 | 34.2 | 0.0000 |
| S4 | Aspheric | 2.6561 | 0.1599 | | | 0.0000 |
| S5 | Aspheric | −20.0776 | 0.3581 | 1.75 | 52.3 | 0.0000 |
| S6 | Aspheric | −3.1659 | 0.0300 | | | 0.0000 |
| S7 | Aspheric | −4.8102 | 0.2100 | 1.85 | 23.8 | 0.0000 |
| S8 | Aspheric | −10.0787 | 0.5124 | | | 0.0000 |
| S9 | Aspheric | −1.5033 | 0.3239 | 1.83 | 29.0 | 0.0000 |
| S10 | Aspheric | −1.1951 | 1.0355 | | | −1.0000 |
| S11 | Aspheric | −1.8989 | 0.2149 | 1.85 | 23.8 | −1.0000 |
| S12 | Aspheric | −12.6826 | 0.5705 | | | 0.0000 |
| S13 | Spherical | Infinite | | | | |

As can be seen from Table 16 that in example 6, both the object-side surface and the image-side surface of any one of the first lens E1 to the sixth lens E6 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 |
|---|---|---|---|---|---|---|
| S1 | −1.9870E−02 | −4.8060E−02 | 1.5841E−01 | −4.3346E−01 | 5.9832E−01 | −3.2820E−01 |
| S2 | −1.5659E−01 | 4.5848E−01 | −9.1124E−01 | 3.6542E+00 | −6.4100E+00 | 3.6243E+00 |
| S3 | −1.3390E−01 | 6.921 IE−01 | −1.1068E+00 | 3.5495E+00 | −6.1336E+00 | 3.2580E+00 |
| S4 | −1.9300E−03 | 3.7980E−01 | −1.2188E+00 | 2.3995E+00 | −3.0600E+00 | 1.6959E+00 |
| S5 | −4.1510E−02 | −1.1854E−01 | 1.2535E+00 | −4.0408E+00 | 6.5595E+00 | −4.0828E+00 |
| S6 | −4.1066E−01 | 9.8081E−01 | −1.7872E+00 | 8.3216E−01 | 1.4699E+00 | −1.7709E+00 |
| S7 | −5.2421E−01 | 6.0166E−01 | 9.8955E−02 | −4.9533E+00 | 9.5881E+00 | −5.4340E+00 |
| S8 | −1.9689E−01 | 1.1574E−01 | −3.3842E−01 | 4.9148E−01 | −4.7963E−01 | 4.8003E−01 |
| S9 | 6.2480E−03 | −1.2196E−01 | 5.5315E−01 | −8.8096E−01 | 5.6335E−01 | −1.1801E−01 |
| S10 | 2.3046E−02 | −5.5080E−02 | 2.1911E−01 | −1.9765E−01 | 7.5736E−02 | −1.2410E−02 |
| S11 | 1.2313E−01 | −7.6600E−02 | 3.0231E−02 | −6.5000E−03 | 7.0500E−04 | −3.1000E−05 |
| S12 | 1.7436E−02 | −1.5700E−02 | 2.7390E−03 | 1.9300E−04 | −9.5000E−05 | 6.6700E−06 |

Table 18 shows effective focal lengths f1 to f6 of respective lens, a total effective focal length f of the optical imaging lens group, a distance TTL along the optical axis from the object-side surface S1 of the first lens E1 to the imaging plane S13, and half of a diagonal length ImgH of an effective pixel area on the imaging plane S13 in example 6.

TABLE 18

| | | | |
|---|---|---|---|
| f1 (mm) | 3.49 | f6 (mm) | −2.64 |
| f2 (mm) | −9.97 | f (mm) | 3.40 |
| f3 (mm) | 4.92 | TTL (mm) | 3.99 |
| f4 (mm) | −10.99 | ImgH (mm) | 3.26 |
| f5 (mm) | 4.75 | | |

FIG. 12A illustrates a longitudinal aberration curve of the optical imaging lens group according to example 6, representing deviations of focal points converged by light of different wavelengths after passing through the lens group. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion corresponding to different image heights. FIG. 12D illustrates a lateral color curve of the optical imaging lens group according to example 6, representing deviations of different image heights on an imaging plane after light passes through the lens group. It can be seen from FIG. 12A to FIG. 12D that the optical imaging lens group provided in example 6 may achieve good image quality.

Example 7

An optical imaging lens group according to example 7 of the present disclosure is described below with reference to FIG. 13 to FIG. 14D. FIG. 13 shows a schematic structural view of the optical imaging lens group according to example 7 of the present disclosure.

As shown in FIG. 13, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 19 shows surface type, radius of curvature, thickness, material and conic coefficient of each lens of the optical imaging lens group in example 7, wherein the units for the radius of curvature and the thickness are millimeter (mm).

TABLE 19

| Surface number | Surface type | Radius of curvature | Thick-ness | Material | | Conic coefficient |
|---|---|---|---|---|---|---|
| | | | | Refrac-tive index | Abbe number | |
| OBJ | Spherical | Infinite | Infinite | | | |
| STO | Spherical | Infinite | −0.3067 | | | |
| S1 | Aspheric | 1.2598 | 0.5112 | 1.55 | 56.1 | 0.3739 |
| S2 | Aspheric | 4.4347 | 0.0566 | | | −1.3051 |
| S3 | Aspheric | 7.1376 | 0.2100 | 1.68 | 19.2 | 0.0000 |
| S4 | Aspheric | 3.0783 | 0.2179 | | | −4.2507 |
| S5 | Aspheric | 19.9649 | 0.2242 | 1.55 | 56.1 | 98.9588 |
| S6 | Aspheric | 15.7414 | 0.1037 | | | 0.0000 |
| S7 | Aspheric | 5.6979 | 0.2302 | 1.68 | 19.2 | 0.0000 |
| S8 | Aspheric | 6.9731 | 0.5147 | | | 0.0000 |
| S9 | Aspheric | 4.2298 | 0.4723 | 1.55 | 56.1 | 4.5951 |
| S10 | Aspheric | −4.2407 | 0.5651 | | | −25.4005 |
| S11 | Aspheric | −1.6473 | 0.3150 | 1.55 | 56.1 | −8.2599 |
| S12 | Aspheric | 5.5678 | 0.3183 | | | −2.8017 |
| S13 | Spherical | Infinite | 0.1100 | 1.52 | 64.2 | |
| S14 | Spherical | Infinite | 0.1508 | | | |
| S15 | Spherical | Infinite | | | | |

As can be seen from Table 19 that in example 7, both the object-side surface and the image-side surface of any one of the first lens E1 to the sixth lens E6 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 |
|---|---|---|---|---|---|
| S1 | −2.9130E−02 | 9.6542E−02 | −1.1118E+00 | 6.0109E+00 | −2.0259E+01 |
| S2 | −1.9241E−01 | 1.2968E−01 | 1.1037E+00 | −8.2666E+00 | 3.3701E+01 |
| S3 | −2.2848E−01 | 2.9311E−01 | 2.2059E+00 | −1.6393E+01 | 6.5356E+01 |
| S4 | −5.5340E−02 | 4.2815E−01 | −1.5633E+00 | 1.3878E+01 | −7.6665E+01 |
| S5 | −1.9162E−01 | 1.3608E+00 | −1.3027E+01 | 7.4894E+01 | −2.8442E+02 |
| S6 | −4.3846E−01 | 2.2791E+00 | −1.2194E+01 | 4.6960E+01 | −1.2996E+02 |
| S7 | −6.6648E−01 | 1.6478E+00 | −4.0877E+00 | 5.8052E+00 | 1.6142E+00 |
| S8 | −4.7999E−01 | 9.3909E−01 | −2.4747E+00 | 5.8106E+00 | −9.8802E+00 |
| S9 | −1.2400E−01 | 1.0388E−01 | −1.8483E−01 | 2.6777E−01 | −3.7940E−01 |
| S10 | −4.3880E−02 | −6.0100E−02 | 3.7389E−01 | −5.4910E−01 | 3.8065E−01 |
| S11 | −5.8616E−01 | 7.7203E−01 | −5.2175E−01 | 2.1781E−01 | −5.8860E−02 |
| S12 | −3.1262E−01 | 3.1632E−01 | −1.9541E−01 | 7.5563E−02 | −1.8290E−02 |

| Surface number | A14 | A16 | A18 | A20 |
|---|---|---|---|---|
| S1 | 4.1750E+01 | −5.1834E+01 | 3.5327E+01 | −1.0184E+01 |
| S2 | −8.5005E+01 | 1.2839E+02 | −1.0537E+02 | 3.5935E+01 |
| S3 | −1.6062E+02 | 2.3864E+02 | −1.9401E+02 | 6.5919E+01 |
| S4 | 2.4251E+02 | −4.3839E+02 | 4.2274E+02 | −1.6645E+02 |
| S5 | 6.8972E+02 | −1.0267E+03 | 8.4679E+02 | −2.9041E+02 |
| S6 | 2.4276E+02 | −2.9125E+02 | 2.0273E+02 | −6.1188E+01 |
| S7 | −2.3598E+01 | 4.1300E+01 | −3.0863E+01 | 8.6058E+00 |
| S8 | 1.1381E+01 | −8.0606E+00 | 3.0968E+00 | −4.9079E−01 |
| S9 | 3.0142E−01 | −1.2301E−01 | 2.4829E−02 | −1.9800E−03 |
| S10 | −1.4507E−01 | 3.1156E−02 | −3.5200E−03 | 1.6200E−04 |
| S11 | 1.0317E−02 | −1.1300E−03 | 7.0400E−05 | −1.9000E−06 |
| S12 | 2.6360E−03 | −2.0000E−04 | 5.6100E−06 | 6.3600E−08 |

Table 21 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 7.

TABLE 21

| | | | |
|---|---|---|---|
| f1 (mm) | 3.05 | f6 (mm) | −2.29 |
| f2 (mm) | −8.16 | f (mm) | 3.50 |
| f3 (mm) | −138.90 | TTL (mm) | 4.00 |
| f4 (mm) | 42.86 | ImgH (mm) | 3.26 |
| f5 (mm) | 3.96 | | |

FIG. 14A illustrates a longitudinal aberration curve of the optical imaging lens group according to example 7, representing deviations of focal points converged by light of different wavelengths after passing through the lens group. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion corresponding to different image heights. FIG. 14D illustrates a lateral color curve of the optical imaging lens group according to example 7, representing deviations of different image heights on an imaging plane after light passes through the lens group. It can be seen from FIG. 14A to FIG. 14D that the optical imaging lens group provided in example 7 may achieve good image quality.

Example 8

An optical imaging lens group according to example 8 of the present disclosure is described below with reference to FIG. 15 to FIG. 16D. FIG. 15 shows a schematic structural view of the optical imaging lens group according to example 8 of the present disclosure.

As shown in FIG. 15, the optical imaging lens group according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface.

The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 22 shows surface type, radius of curvature, thickness, material and conic coefficient of each lens of the optical imaging lens group in example 8, wherein the units for the radius of curvature and the thickness are millimeter (mm).

TABLE 22

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.2889 | | | |
| S1 | Aspheric | 1.3129 | 0.4943 | 1.55 | 56.1 | −0.3658 |
| S2 | Aspheric | 4.7619 | 0.0479 | | | 3.0431 |
| S3 | Aspheric | 5.1694 | 0.2100 | 1.68 | 19.2 | 0.0000 |
| S4 | Aspheric | 2.7513 | 0.2232 | | | −6.7712 |
| S5 | Aspheric | 33.3333 | 0.2608 | 1.55 | 56.1 | 99.0000 |
| S6 | Aspheric | 112.4315 | 0.1120 | | | −99.0000 |
| S7 | Aspheric | 7.1429 | 0.2268 | 1.68 | 19.2 | 0.0000 |
| S8 | Aspheric | 6.8317 | 0.4477 | | | 0.0000 |
| S9 | Aspheric | 6.1211 | 0.4211 | 1.55 | 56.1 | 13.9425 |
| S10 | Aspheric | −3.2655 | 0.6079 | | | −16.2257 |
| S11 | Aspheric | −4.0633 | 0.3150 | 1.55 | 56.1 | 0.2314 |
| S12 | Aspheric | 1.8642 | 0.3454 | | | −17.7040 |
| S13 | Spherical | Infinite | 0.1100 | 1.52 | 64.2 | |
| S14 | Spherical | Infinite | 0.1776 | | | |
| S15 | Spherical | Infinite | | | | |

As can be seen from Table 22 that in example 8, both the object-side surface and the image-side surface of any one of the first lens E1 to the sixth lens E6 are aspheric. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 |
|---|---|---|---|---|---|
| S1 | 7.8290E−03 | 8.4816E−02 | −9.2690E−02 | −1.4469E+00 | 8.0323E+00 |
| S2 | −1.6533E−01 | −4.5070E−01 | 7.5843E+00 | −4.5653E+01 | 1.6577E+02 |
| S3 | −1.7915E−01 | −4.5229E−01 | 9.3457E+00 | −5.5659E+01 | 1.9893E+02 |
| S4 | −7.9390E−02 | 1.6338E+00 | −1.6935E+01 | 1.2283E+02 | −5.4786E+02 |
| S5 | −1.3998E−01 | 1.0780E+00 | −1.1103E+01 | 7.0447E+01 | −2.9378E+02 |
| S6 | −2.6778E−01 | 9.0207E−01 | −4.4571E+00 | 1.9474E+01 | −6.7103E+01 |
| S7 | −5.6833E−01 | 1.2719E+00 | −3.9955E+00 | 1.1918E+01 | −2.9046E+01 |
| S8 | −4.6270E−01 | 9.5439E−01 | −2.9009E+00 | 7.4222E+00 | −1.3150E+01 |
| S9 | −2.6290E−02 | −3.6431E−01 | 1.1815E+00 | −2.1546E+00 | 2.3128E+00 |
| S10 | 2.1789E−02 | −2.9603E−01 | 8.1718E−01 | −1.0528E+00 | 7.4205E−01 |
| S11 | −5.1436E−01 | 5.3326E−01 | −2.7623E−01 | 9.0082E−02 | −1.9740E−02 |
| S12 | −2.7378E−01 | 2.5383E−01 | −1.4913E−01 | 5.6712E−02 | −1.3980E−02 |

| Surface number | A14 | A16 | A18 | A20 |
|---|---|---|---|---|
| S1 | −1.9227E+01 | 2.3898E+01 | −1.4924E+01 | 3.5826E+00 |
| S2 | −3.7818E+02 | 5.2484E+02 | −4.0292E+02 | 1.3062E+02 |
| S3 | −4.4864E+02 | 6.1946E+02 | −4.7475E+02 | 1.5369E+02 |
| S4 | 1.5035E+03 | −2.4801E+03 | 2.2582E+03 | −8.7119E+02 |
| S5 | 7.7873E+02 | −1.2597E+03 | 1.1271E+03 | −4.2328E+02 |
| S6 | 1.5187E+02 | −2.0988E+02 | 1.5974E+02 | −5.0485E+01 |
| S7 | 5.0653E+01 | −5.7956E+01 | 3.8975E+01 | −1.1580E+01 |
| S8 | 1.5149E+01 | −1.0472E+01 | 3.8832E+00 | −5.9039E−01 |
| S9 | −1.5725E+00 | 6.6222E−01 | −1.5496E−01 | 1.5219E−02 |
| S10 | −3.0692E−01 | 7.4532E−02 | −9.8500E−03 | 5.4700E−04 |
| S11 | 2.9510E−03 | −2.9000E−04 | 1.7500E−05 | −4.8000E−07 |
| S12 | 2.1750E−03 | −2.0000E−04 | 1.0300E−05 | −2.2000E−07 |

Table 24 shows effective focal lengths f1 to f6 of respective lens, a total effective focal length f of the optical imaging lens group, a distance TTL along the optical axis from the object-side surface S1 of the first lens E1 to the imaging plane S15, and half of a diagonal length ImgH of an effective pixel area on the imaging plane S15 in example 8.

TABLE 24

| | | | |
|---|---|---|---|
| f1 (mm) | 3.16 | f6 (mm) | −2.30 |
| f2 (mm) | −9.00 | f (mm) | 3.50 |
| f3 (mm) | 86.69 | TTL (mm) | 4.00 |
| f4 (mm) | −328.03 | ImgH (mm) | 3.26 |
| f5 (mm) | 3.96 | | |

Figure 16A:
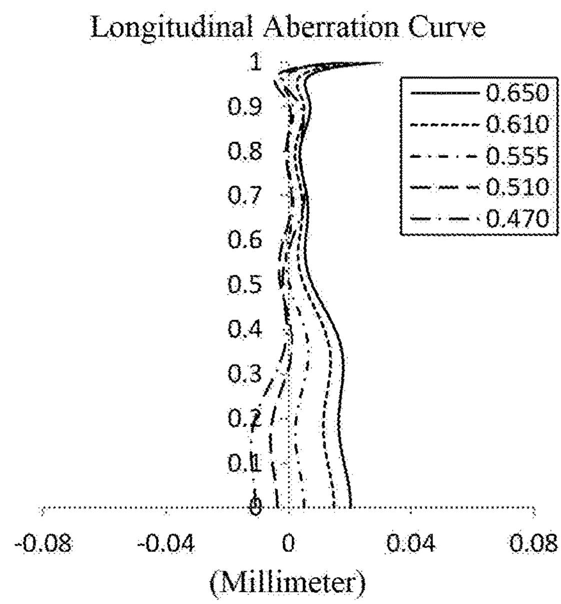
FIGS. 16A to 16D illustrate a longitudinal aberration curve, an astigmatic curve, a distortion curve, and a lateral color curve of the optical imaging lens group of the example 8, respectively.
Figure 16B:
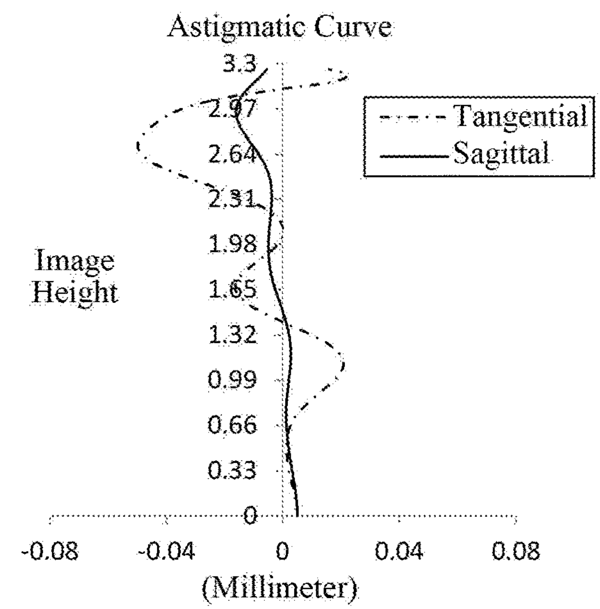
Figure 16C:
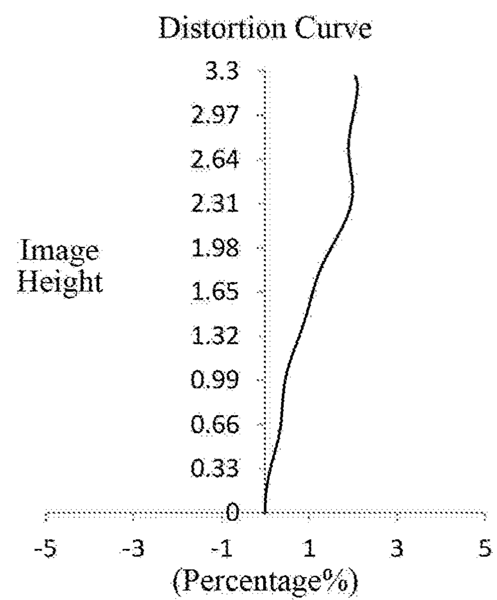
Figure 16D:
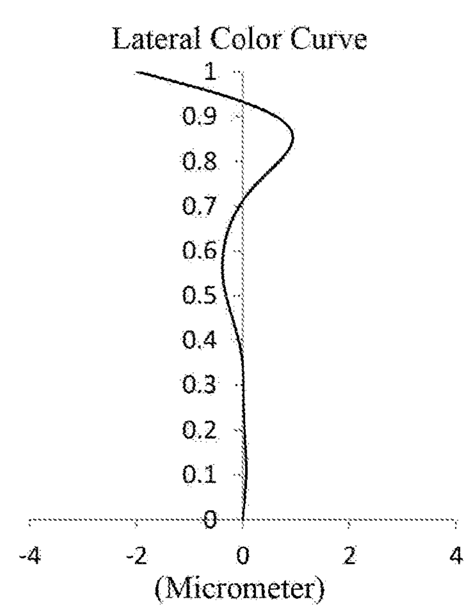

FIG. 16A illustrates a longitudinal aberration curve of the optical imaging lens group according to example 8, representing deviations of focal points converged by light of different wavelengths after passing through the lens group. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion corresponding to different image heights. FIG. 16D illustrates a lateral color curve of the optical imaging lens group according to example 8, representing deviations of different image heights on an imaging plane after light passes through the lens group. It can be seen from FIG. 16A to FIG. 16D that the optical imaging lens group provided in example 8 may achieve good image quality.

In view of the above, examples 1 to 8 respectively satisfy the relationship shown in Table 25.

TABLE 25

| Conditional\Example | 1 | 2 | 3 | 4 | 5 | 6 | 7 | 8 |
|---|---|---|---|---|---|---|---|---|
| TTL/ImgH | 1.18 | 1.19 | 1.23 | 1.21 | 1.20 | 1.22 | 1.23 | 1.23 |
| f1/\|f6\| | 0.75 | 1.21 | 1.33 | 1.16 | 1.14 | 1.32 | 1.33 | 1.38 |
| (R2 + R1)/(R2 − R1) | 1.72 | 1.63 | 1.76 | 1.64 | 1.65 | 2.79 | 1.79 | 1.76 |
| f/(\|R4 − R11\|) | 0.48 | 0.86 | 0.52 | 0.54 | 0.16 | 0.75 | 0.74 | 0.51 |
| (f5 + f2)/(f5 − f2) | 0.50 | 0.00 | −0.42 | −0.16 | −0.10 | −0.35 | −0.35 | −0.39 |
| Semi-FOV | 40.7 | 42.5 | 42.0 | 42.0 | 42.1 | 44.6 | 41.9 | 42.0 |
| (CT5 + CT6)/(T45 + T56) | 0.82 | 0.54 | 0.69 | 0.84 | 0.83 | 0.35 | 0.73 | 0.70 |
| DT61/DT31 | 3.48 | 3.45 | 3.11 | 3.24 | 3.38 | 3.29 | 3.18 | 3.17 |
| DT42/DT32 | 1.40 | 1.57 | 1.24 | 1.59 | 1.58 | 1.14 | 1.38 | 1.31 |
| \|CT3/R6 + CT4/R8\|*10 | 0.004 | 0.431 | 0.434 | 0.288 | 0.485 | 1.340 | 0.473 | 0.355 |
| ImgH/(CT1 + CT2 + CT3 + CT4) | 2.65 | 2.59 | 2.72 | 2.59 | 2.57 | 2.95 | 2.77 | 2.74 |
| ET2/CT2 | 1.29 | 1.33 | 1.34 | 1.30 | 1.29 | 1.08 | 1.36 | 1.32 |
| CRAmax | 36.00 | 36.69 | 37.29 | 36.50 | 36.48 | 36.51 | 36.31 | 36.98 |
| (SAG11 − SAG12)/(SAG11 + SAG12) | 0.82 | 0.75 | 0.81 | 0.84 | 0.82 | 0.38 | 0.81 | 0.80 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device, such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, sequentially from an object side to an image side along an optical axis, comprising: a first lens, a second lens, a third lens, a fourth lens, a fifth lens, and a sixth lens, each of which has refractive power, wherein, the first lens has positive refractive power, an object-side surface of the first lens is a convex surface, and an image-side surface of the first lens is a concave surface;

the second lens has negative refractive power, and an image-side surface of the second lens is a concave surface;

the fifth lens has positive refractive power;

the sixth lens has negative refractive power, and an object-side surface of sixth lens is a concave surface; and $1.18 \leq TTL/ImgH \leq 1.22$, where TTL is a distance along the optical axis from the object-side surface of the first lens to an imaging plane of the optical imaging lens group, and ImgH is half of a diagonal length of an effective pixel area on the imaging plane of the optical imaging lens group.

2. The optical imaging lens group according to claim 1, wherein $f1/|f6|<1.45$, where f1 is an effective focal length of the first lens, and f6 is an effective focal length of the sixth lens.

3. The optical imaging lens group according to claim 1, wherein $1.6<(R2+R1)/(R2-R1)<2.8$, where R1 is a radius of curvature of the object-side surface of the first lens, and R2 is a radius of curvature of the image-side surface of the first lens.

4. The optical imaging lens group according to claim 1, wherein $0.1<f/(|R4-R11|)<0.9$, where f is a total effective focal length of the optical imaging lens group, R4 is a radius of curvature of the image-side surface of the second lens, and R11 is a radius of curvature of the object-side surface of the sixth lens.

5. The optical imaging lens group according to claim 1, wherein $-0.6<(f5+f2)/(f5-f2)<0.6$, where f5 is an effective focal length of the fifth lens, and f2 is an effective focal length of the second lens.

6. The optical imaging lens group according to claim 1, wherein $0.3<(CT5+CT6)/(T45+T56)<0.9$, where CT5 is a center thickness of the fifth lens along the optical axis, CT6 is a center thickness of the sixth lens along the optical axis, T45 is a spaced interval between the fourth lens and the fifth lens along the optical axis, and T56 is a spaced interval between the fifth lens and the sixth lens along the optical axis.

7. The optical imaging lens group according to claim 1, wherein $3.0<DT61/DT31<3.5$, where DT61 is a maximum effective radius of the object-side surface of the sixth lens, and DT31 is a maximum effective radius of an object-side surface of the third lens.

8. The optical imaging lens group according to claim 1, wherein $1.1<DT42/DT32<1.6$, where DT42 is a maximum effective radius of an image-side surface of the fourth lens, and DT32 is a maximum effective radius of an image-side surface of the third lens.

9. The optical imaging lens group according to claim 1, wherein $0<|CT3/R6+CT4/R8|*10<1.4$, where CT3 is a center thickness of the third lens along the optical axis, CT4 is a center thickness of the fourth lens along the optical axis, R6 is a radius of curvature of an image-side surface of the third lens, and R8 is a radius of curvature of an image-side surface of the fourth lens.

10. The optical imaging lens group according to claim 1, wherein $2.5<ImgH/(CT1+CT2+CT3+CT4)<3.0$, where ImgH is half of the diagonal length of the effective pixel area on the imaging plane of the optical imaging lens group, CT1 is a center thickness of the first lens along the optical axis, CT2 is a center thickness of the second lens along the optical axis, CT3 is a center thickness of the third lens along the optical axis, and CT4 is a center thickness of the fourth lens along the optical axis.

11. The optical imaging lens group according to claim 1, wherein $0.9<ET2/CT2<1.4$, where ET2 is an edge thickness of the second lens, and CT2 is a center thickness of the second lens along the optical axis.

12. The optical imaging lens group according to claim 1, wherein $0.3<(SAG11-SAG12)/(SAG11+SAG12)<0.9$, where SAG11 is an on-axis distance from an intersection of the object-side surface of the first lens and the optical axis to a vertex of a maximum effective radius of the object-side surface of the first lens, and SAG12 is an on-axis distance from an intersection of the image-side surface of the first lens and the optical axis to a vertex of a maximum effective radius of the image-side surface of the first lens.

13. The optical imaging lens group according to claim 1, wherein $40°<\text{Semi-FOV}<50°$, where Semi-FOV is half of a maximum field-of-view of the optical imaging lens group.

14. The optical imaging lens group according to claim 1, wherein $35°<CRAmax<40°$, where CRAmax is a maximum incident angle of a chief ray incident on an electronic photosensitive component of the optical imaging lens group.

15. An optical imaging lens group, sequentially from an object side to an image side along an optical axis, comprising: a first lens, a second lens, a third lens, a fourth lens, a fifth lens, and a sixth lens, each of which has refractive power, wherein, the first lens has positive refractive power, an object-side surface of the first lens is a convex surface, and an image-side surface of the first lens is a concave surface;

the second lens has negative refractive power, and an image-side surface of the second lens is a concave surface;

the fifth lens has positive refractive power;

the sixth lens has negative refractive power, and an object-side surface of sixth lens is a concave surface; and $2.72\leq ImgH/(CT1+CT2+CT3+CT4)<3.0$, where ImgH is half of a diagonal length of an effective pixel area on an imaging plane of the optical imaging lens group, CT1 is a center thickness of the first lens along the optical axis, CT2 is a center thickness of the second lens along the optical axis, CT3 is a center thickness of the third lens along the optical axis, and CT4 is a center thickness of the fourth lens along the optical axis.

16. The optical imaging lens group according to claim 15, wherein $1.6<(R2+R1)/(R2-R1)<2.8$, where R1 is a radius of curvature of the object-side surface of the first lens, and R2 is a radius of curvature of the image-side surface of the first lens.

17. The optical imaging lens group according to claim 15, wherein $0.3<(CT5+CT6)/(T45+T56)<0.9$, where CT5 is a center thickness of the fifth lens along the optical axis, CT6 is a center thickness of the sixth lens along the optical axis, T45 is a spaced interval between the fourth lens and the fifth lens along the optical axis, and T56 is a spaced interval between the fifth lens and the sixth lens along the optical axis.

18. The optical imaging lens group according to claim 15, wherein $0.9<ET2/CT2<1.4$, where ET2 is an edge thickness of the second lens, and CT2 is a center thickness of the second lens along the optical axis.

19. The optical imaging lens group according to claim 15, wherein $0.3<(SAG11-SAG12)/(SAG11+SAG12)<0.9$, where SAG11 is an on-axis distance from an intersection of the object-side surface of the first lens and the optical axis to a vertex of a maximum effective radius of the object-side surface of the first lens, and SAG12 is an on-axis distance from an intersection of the image-side surface of the first lens and the optical axis to a vertex of a maximum effective radius of the image-side surface of the first lens.

20. The optical imaging lens group according to claim 15, wherein $3.0<DT61/DT31<3.5$, where DT61 is a maximum effective radius of the object-side surface of the sixth lens, and DT31 is a maximum effective radius of an object-side surface of the third lens.

* * * * *